US011544005B2

(12) United States Patent
Yamamoto et al.

(10) Patent No.: US 11,544,005 B2
(45) Date of Patent: Jan. 3, 2023

(54) STORAGE SYSTEM AND PROCESSING METHOD

(71) Applicant: Hitachi, Ltd., Tokyo (JP)

(72) Inventors: Takahiro Yamamoto, Tokyo (JP); Hiroto Ebara, Tokyo (JP); Takeru Chiba, Tokyo (JP); Yoshinori Ohira, Tokyo (JP); Masakuni Agetsuma, Tokyo (JP); Mikio Fukuoka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 89 days.

(21) Appl. No.: 17/017,944

(22) Filed: Sep. 11, 2020

(65) Prior Publication Data

US 2021/0247934 A1 Aug. 12, 2021

(30) Foreign Application Priority Data

Feb. 10, 2020 (JP) .............................. JP2020-021036

(51) Int. Cl.
*G06F 3/00* (2006.01)
*G06F 3/06* (2006.01)

(52) U.S. Cl.
CPC .......... *G06F 3/0659* (2013.01); *G06F 3/0604* (2013.01); *G06F 3/067* (2013.01); *G06F 3/0619* (2013.01); *G06F 3/0629* (2013.01); *G06F 3/0653* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 2005/0063217 A1 | 3/2005 | Shiraishi et al. | |
| 2014/0195847 A1 | 7/2014 | Webman et al. | |
| 2016/0034719 A1* | 2/2016 | Choi | G06F 12/1408 713/193 |
| 2018/0373429 A1 | 12/2018 | Yamamoto et al. | |
| 2022/0011977 A1* | 1/2022 | Sugiyama | G06F 3/067 |

FOREIGN PATENT DOCUMENTS

| | | | |
|---|---|---|---|
| JP | 2005-099998 A | 4/2005 | |
| WO | WO 2017/145223 A1 | 8/2017 | |
| WO | WO-2018000812 A1 * | 1/2018 | .......... G06F 11/1076 |

OTHER PUBLICATIONS

Notice of Reasons for Refusal, dated Jan. 25, 2022, for Japanese Application No. 2020-021036 (with English translation).

* cited by examiner

*Primary Examiner* — Midys Rojas
(74) *Attorney, Agent, or Firm* — Baker Botts L.L.P.

(57) ABSTRACT

In a storage system including a plurality of nodes that provide a storage area and a drive that physically stores data, a parity group is configured with a plurality of data including user data stored in the storage area and redundant data for protecting the user data, a plurality of data in the parity group are stored in a storage area within one predetermined range across a plurality of nodes, and processing for dividing the predetermined range or processing for merging a plurality of predetermined ranges is performed based on a state of the predetermined range.

14 Claims, 26 Drawing Sheets

FIG. 7

PARITY GROUP MANAGEMENT TABLE — 413

LOGICAL CHUNK MANAGEMENT TABLE — 710

| LOGICAL CHUNK ID | SIZE | PARITY GROUP ID | MAPPING CHANGE PROGRESS INFORMATION |
|---|---|---|---|
| 0 | 128 GB | 0 | 0% |
| 1 | 342 GB | 1 → 3 | 50% |
| 2 | 342 GB | 2 | 0% |

711　712　713　714

PARITY GROUP MANAGEMENT TABLE — 720

| PARITY GROUP ID | DATA PROTECTION POLICY | PHYSICAL CHUNK ID |
|---|---|---|
| 0 | 1D1P | 0, 1 |
| 1 | 2D1P | 2, 6, 10 |
| 2 | 4D2P | 3, 4, 5, 7, 8, 9 |
| 3 | 2D1P | 11, 12, 13 |

721　722　723

PHYSICAL CHUNK MANAGEMENT TABLE — 730

| PHYSICAL CHUNK ID | START OFFSET | SIZE | SITE ID / NODE ID / DRIVE ID |
|---|---|---|---|
| 0 | 0x00000000 | 256 GB | 0 / 0 / 0 |
| 1 | 0x0C800000 | 256 GB | 0 / 1 / 2 |
| 2 | 0x00000000 | 512 GB | 0 / 3 / 10 |

731　732　733　734

740

SITE 0 / NODE 1 — PHYSICAL CHUNK ID: 14 → 15 → 16

FIG. 8

GROUP MAPPING MANAGEMENT TABLE — 414

MAPPING MANAGEMENT TABLE — 810

| GROUP MAP ID | NUMBER OF COLUMNS | LOCATION ID | GROUPING INFORMATION (COLUMN ID - COLUMN ID - COLUMN ID) |
|---|---|---|---|
| 0 | 3 | 0 | 0 – 1 – 2 |
| 1 | 4 | 0 | 0 – 1 – 2 |
|   |   | 1 | 1 – 2 – 3 |
|   |   | 2 | 2 – 3 – 0 |
|   |   | 3 | 3 – 0 – 1 |
| ... | ... | ... | ... |

811  812  813  814

MAPPING DIVISION MANAGEMENT TABLE — 820

| NUMBER OF NODES | NUMBER OF MAP DIVISIONS | MAP DIVISION INFORMATION |
|---|---|---|
| 3 | 1 | 3 |
| ... | ... | ... |
| 15 | 2 | 7, 8 |
| 16 | 3 | 5, 5, 6 |
| ... | ... | ... |

821  822  823

CORRESPONDENCE MANAGEMENT TABLE — 830

| NODE ID | GROUP MAP ID | INDEX ID | COLUMN ID |
|---|---|---|---|
| 0 | 1 | 0 | 0 |
| 1 | 1 | 0 | 1 |
| 2 | 1 | 0 | 2 |
| 4 | 1 | 0 | 3 |
| 5 | 1 | 1 | 0 |
| ... | ... | ... | ... |

NODE-GROUP CORRESPONDENCE INFORMATION (IN CASE OF 7 NODES) — 901

| NODE ID | N1 | N2 | N3 | N4 | N5 | N6 | N7 |
|---|---|---|---|---|---|---|---|
| GROUP MAP ID | GroupMapID 4 ||||||||
| INDEX ID | Index 0 ||||||||
| COLUMN ID | C0 | C1 | C2 | C3 | C4 | C5 | C6 |

MAPPING MANAGEMENT TABLE (GroupMapID=4) — 902

COLUMN ID

| LOCATION ID | C0 | C1 | C2 | C3 | C4 | C5 | C6 |
|---|---|---|---|---|---|---|---|
| #0 | G0 | G0 | G0 | | | | |
| #1 | | G1 | G1 | G1 | | | |
| #2 | | | G2 | G2 | G2 | | |
| #3 | | | | G3 | G3 | G3 | |
| #4 | | | | | G4 | G4 | G4 |
| #5 | G5 | | | | | G5 | G5 |
| #6 | G6 | G6 | | | | | G6 |

SERVER (N8) ADDITION

NODE-GROUP CORRESPONDENCE INFORMATION (IN CASE OF 8 NODES) — 903

| NODE ID | N1 | N2 | N3 | N4 | N5 | N6 | N7 | N8 |
|---|---|---|---|---|---|---|---|---|
| GROUP MAP ID | GroupMapID 1 |||| GroupMapID 1 ||||
| INDEX ID | Index 0 |||| Index 1 ||||
| COLUMN ID | C0 | C1 | C2 | C3 | C0 | C1 | C2 | C3 |

MAPPING MANAGEMENT TABLE (GroupMapID=1) — 904

COLUMN ID

| LOCATION ID | C0 | C1 | C2 | C3 |
|---|---|---|---|---|
| #0 | G0 | G0 | G0 | |
| #1 | | G1 | G1 | G1 |
| #2 | G2 | | G2 | G2 |
| #3 | G3 | G3 | | G3 |

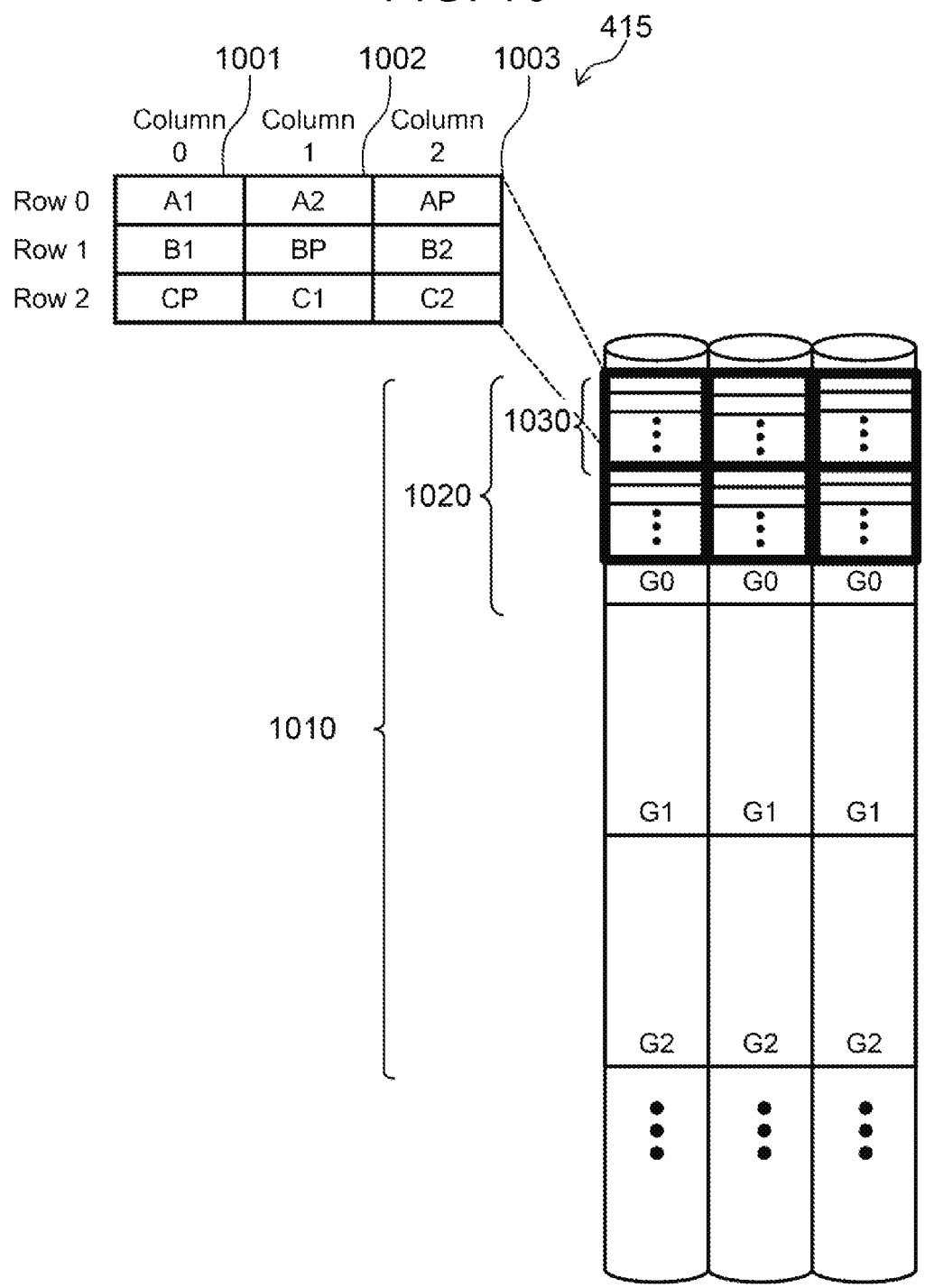

STORAGE SYSTEM AND PROCESSING METHOD

BACKGROUND OF THE INVENTION

1. Field of the Invention

The present invention relates to a storage system and a processing method.

2. Description of Related Art

In the related art, a redundant array of independent disks (RAID) group is configured by a plurality of storage devices in a storage system, and a logical volume created based on the RAID group is provided to a higher-level device (for example, a host computer). For example, distributed RAID is known as a technique related to RAID. The distributed RAID is a technique for distributing and managing a stripe column including data and redundant data for restoring the data in a plurality of storage devices that are more than m+n defined by the data protection policy (mDnP).

In recent years, the market of software defined storage (SDS) is expanding. In this regard, in SDS, a method is disclosed in which a group called a domain is assembled with a certain number of nodes, a storage system is built with a plurality of domains, and data protection between nodes within the domain is applied (see US Patent Application Publication No. 2014-0195847). According to this method, it is possible to limit the nodes whose reliability is deteriorated in the event of a failure of one node within the domain, so that the reliability of the storage system can be improved. US Patent Application Publication No. 2014-0195847 discloses a method of forming a parity group.

In the technology described in US Patent Application Publication No. 2014-0195847, in order to expand the storage system so that the reliability does not fall below the target value, in system expansion after reaching the reliability target value limit, the storage system needs to be expanded in units of minimum configuration (for example, 3 nodes) for building a domain, and thus, the degree of freedom is low.

SUMMARY OF THE INVENTION

A storage system according to a first aspect of the present invention is a storage system that includes a plurality of nodes that provide a storage area and a drive that physically stores data, in which a parity group is configured with a plurality of data including user data stored in the storage area and redundant data for protecting the user data, the plurality of data in the parity group are stored in a storage area in one predetermined range across the plurality of nodes, and processing for dividing the predetermined range or processing for merging a plurality of predetermined ranges is performed based on the state of the predetermined range.

A processing method according to a second aspect of the present invention is a processing method executed by a storage system including a plurality of nodes that provide a storage area, the method including configuring a parity group with a plurality of data including user data stored in the storage area and redundant data for protecting the user data, arranging a plurality of data in the parity group in a storage area within one predetermined range across the plurality of nodes, and performing processing for dividing the predetermined range or processing for merging a plurality of predetermined ranges based on the state of the predetermined range.

According to the present invention, a storage system with high reliability and applicability can be realized.

BRIEF DESCRIPTION OF THE DRAWINGS

FIG. 7 is a diagram showing an example of a parity group management table according to the first embodiment;

FIG. 8 is a diagram showing an example of a group mapping management table according to the first embodiment;

FIG. 9 is a schematic diagram of group mapping management according to the first embodiment;

FIG. 10 is a diagram showing an example of a stripe mapping management table according to the first embodiment;

DESCRIPTION OF EMBODIMENTS

Figure 1:
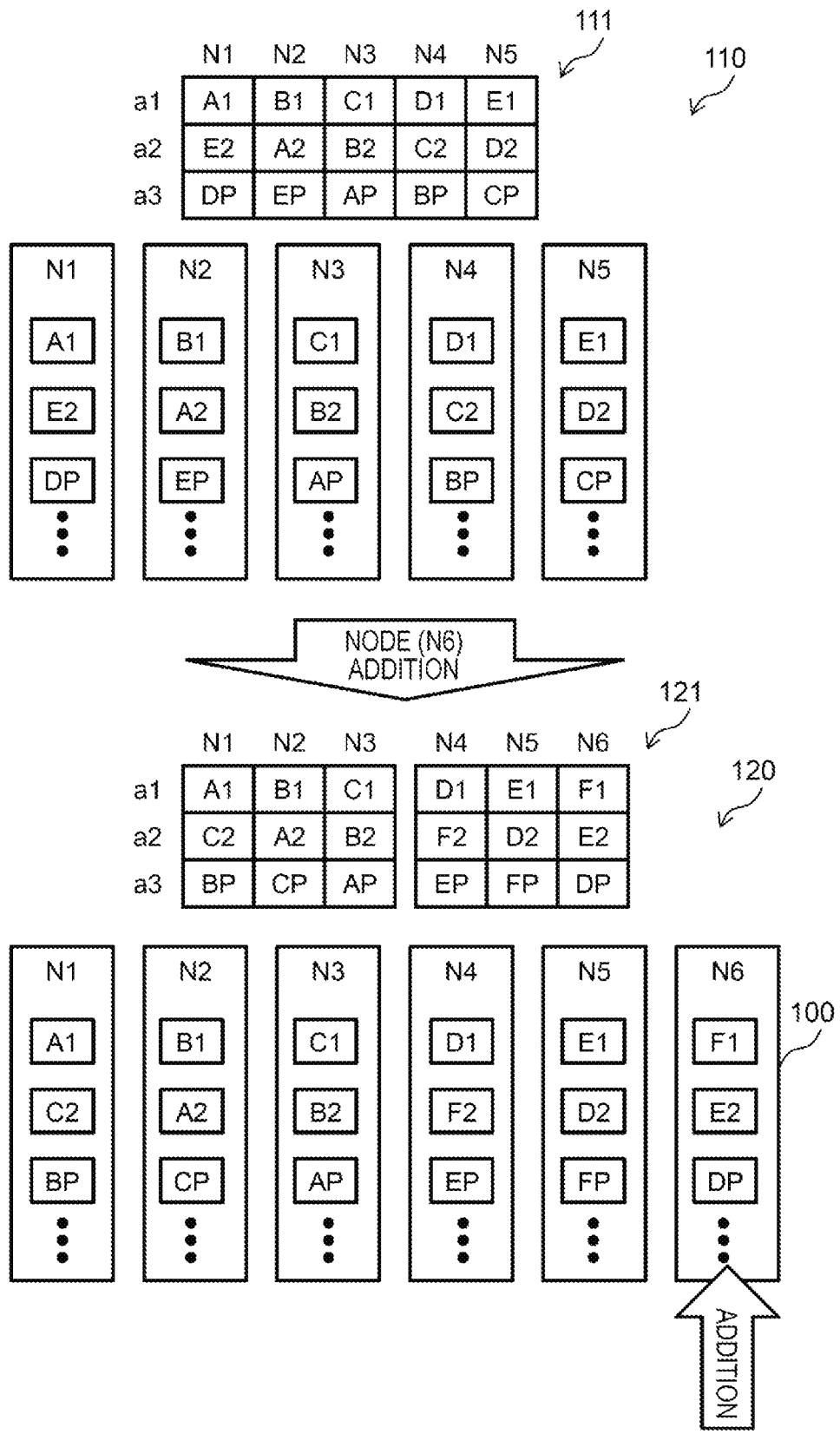
FIG. 1 is a schematic diagram of a storage system according to a first embodiment.

Hereinafter, a plurality of embodiments of the present invention will be described in detail. In the following description, when the same type of elements is described without distinction, a common part of the reference numerals including the branch number, that is, a part excluding the branch number may be used. Further, when the same type of elements is described separately, reference numerals including branch numbers may be used. For example, when the description is made without particularly distinguishing physical areas, the description may be given as "physical area 990", and when the description is made by distinguishing individual areas, the description may be given as "physical area 990-1" and "physical area 990-2".

First Embodiment

Hereinafter, a first embodiment of a storage system according to the present invention will be described with reference to FIGS. 1 to 19.

FIG. 1 is a schematic diagram of a mapping change in a storage system according to the present invention. Here, a case where the configuration is changed from a storage system 110 shown in the upper part of the drawing to a storage system 120 shown in the lower part of the drawing will be described as an example. In FIG. 1, as shown in mapping management information 111 before the configuration change and mapping management information 121 after the configuration change, a node 100 of "N6" is added to the storage system 110, that is, the node is added.

The mapping management information 111 indicates that a combination of A1, A2, and AP constitutes a parity group that manages data and parity. The same applies to Bx to Dx. Further, the mapping management information 111 indicates that a parity group is configured using three data areas like 2D1P, and the 2D1P parity groups are distributed and arranged in N1 to N5.

A technology for arranging data and parity in this way and protecting the data is called distributed RAID, and by configuring distributed RAID, the rebuilding time can be shortened according to the number of nodes (or the number of drives when applied to the drives). On the other hand, if the number of nodes to which the parity groups are distributed and arranged is increased too much, when one node (or drive when applied to the drive) fails, the number of nodes (or drives when applied to the drives) that are affected by the decrease in redundancy will increase and the availability will be deteriorated. For example, when a failure occurs in N1, the data redundancy of N2, N4, and N5 decreases.

The storage system 120 limits the arrangement of data and parity to a specific node when N6 is added. More specifically, the mapping management information 121 divides a map that manages the arrangement of data and parity into two, and configures a parity group with only the areas in each map, thereby limiting the influence range at the time of a node failure. For example, in the storage system 120, when a failure occurs in N1, only nodes N2 and N3 are affected by the decrease in redundancy, and N4 to N6 are not affected.

In the following, the node 100 will be mainly described as an example of a storage resource to be changed in the configuration, that is, a storage resource to be added or removed, but other storage resources such as a site such as a data center or a storage device such as a drive may be used and the same is applied. The present embodiment will be specifically described below.

Figure 2:
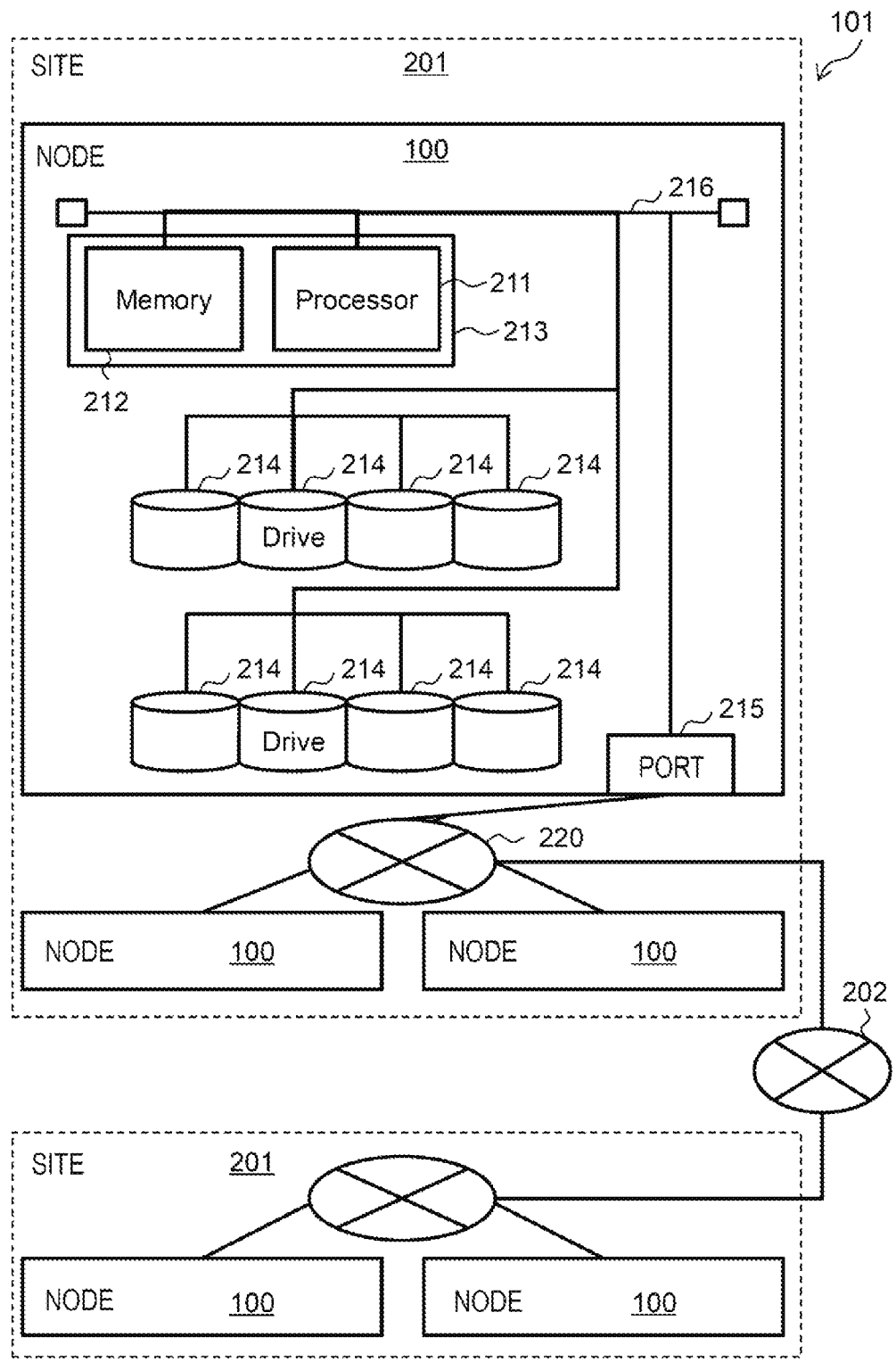
FIG. 2 is a diagram showing an example of a physical configuration related to the storage system according to the first embodiment.

FIG. 2 is a diagram showing an example of the physical configuration of a storage system 101 according to the present embodiment. The storage system 101 is provided with one or more sites 201. Each site 201 is communicably connected via a network 202. The network 202 is, for example, wide area network (WAN), but is not limited to WAN.

The site 201 is a data center, or the like, and is configured to include one or more nodes 100. The node 100 may have a general server computer configuration. The node 100 is configured to include, for example, one or more processor packages 213 including a processor 211, a memory 212, and the like, one or more drives 214, and one or more ports 215. The respective components are connected via an internal bus 216.

The processor 211 is, for example, a central processing unit (CPU) and performs various processes. The memory 212 is used to store control information and data necessary for realizing the function of the node 100. Further, the memory 212 stores, for example, a program executed by the processor 211. The memory 212 may be a volatile dynamic random access memory (DRAM), a non-volatile storage class memory (SCM), or another storage device.

The drive 214 stores various data, programs, and the like. The drive 214 may be a serial attached SCSI (SAS) or serial advanced technology attachment (SATA) connected hard disk drive (HDD) or solid state drive (SSD), non-volatile memory express (NVMe) connected SSD, SCM, or the like, and is an example of a storage device. The port 215 is connected to the network 220 and is communicably connected to another node 100 in the site 201. The network 220 is, for example, a local area network (LAN), but is not limited to the LAN.

The physical configuration of the storage system 101 is not limited to the above contents. For example, the networks 220 and 202 may be made redundant. Further, for example, the network 220 may be separated into a management network and a storage network, and the connection standard may be Ethernet (registered trademark), Infiniband, or wireless. Also, the connection topology is not limited to the configuration shown in FIG. 2.

Figure 3:
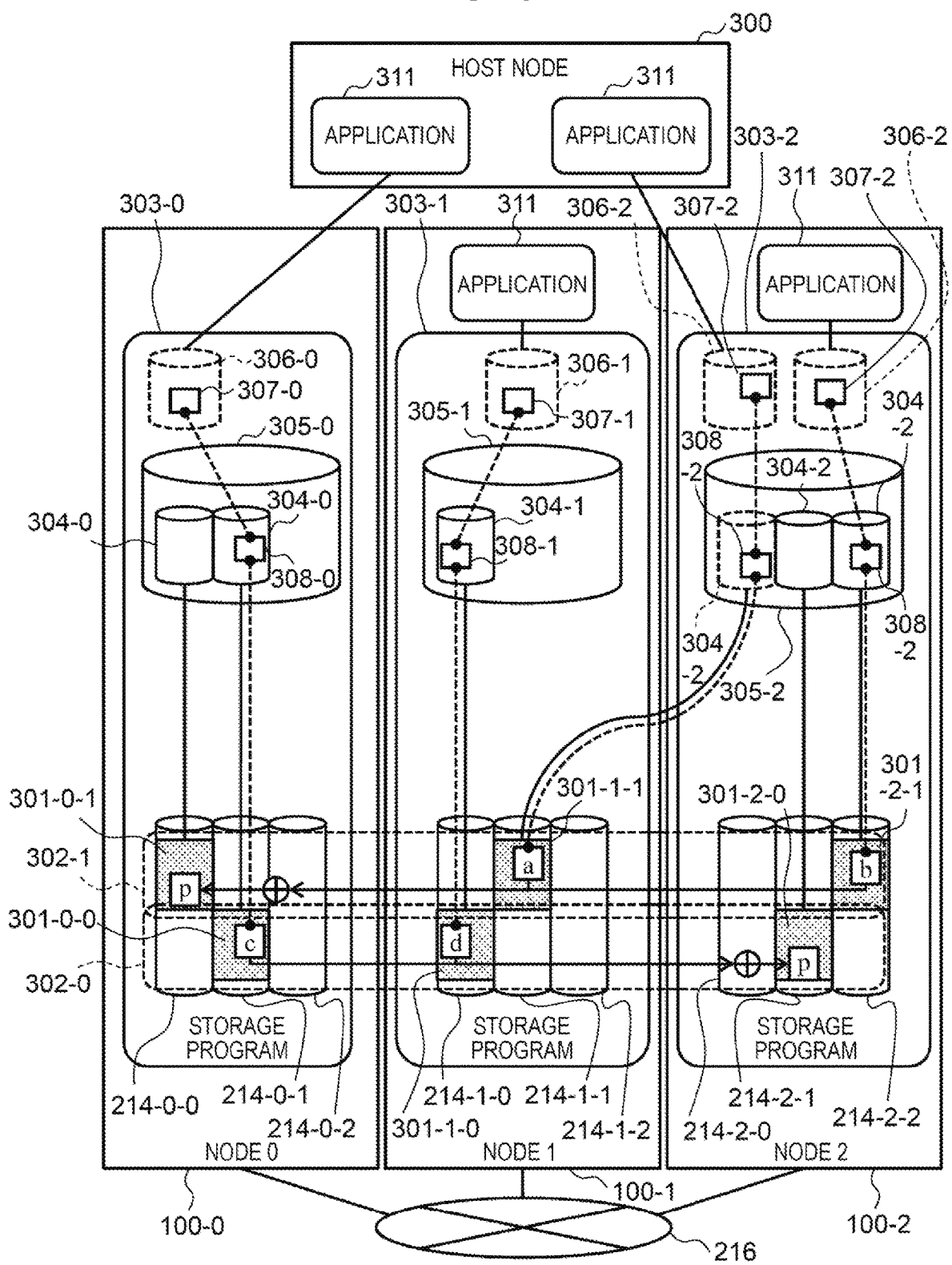
FIG. 3 is a diagram showing an example of a logical configuration related to the storage system according to the first embodiment.

FIG. 3 is a diagram showing an example of a logical configuration related to the storage system 101. In the storage system 101, storage virtualization is performed, and a plurality of physical areas are virtually integrated and used as one storage pool. Furthermore, in the storage system 101, only the capacity currently used by each host node 300 is allocated by thin provisioning.

More specifically, as shown in FIG. 3, the drive 214 includes a data storage area which is a physical area for storing data, parity, and the like. Physical chunks 301, which are all or part of the data storage area and are continuous areas, are allocated to a parity group 302.

The parity group 302 is constituted of physical chunks 301 of the drives 214 of a plurality of nodes 100. For example, when the data protection policy is 4D1P, the parity group 302 is constituted of five physical chunks 301 secured from the drives 214 of different nodes 100.

Here, as a data protection policy, for example, there is EC (Erasure Coding). Like the EC, there are a first method that does not retain data locality and a second method that retains data locality (for example, the method described in International Publication No. 2016/52665), and any method can be applied to the storage system 101. In this embodiment, a case to which the second method is applied will be mainly described as an example.

In addition, for example, in the EC of 2D1P of the first method, the write request data is divided into first data and second data, and the first data is stored in the first node 100-0, the second data is stored in the second node 100-1, and the parity of the first data and the second data is stored in the third node 100-3, thereby achieving redundancy. Also, for example, in the EC of 2D1P of the second method, the write request data is divided into first data and second data, and the first data and the second data are stored in the first node 100-0 (own node 100), the parity of the first data is stored in the second node 100-1, and the parity of the second data is stored in the third node 100-2, thereby achieving redundancy.

A logical chunk 304 is cut out from the parity group 302. The logical chunk 304 is a unit for allocating capacity to a storage pool 305 of each node 100. One logical chunk 304 may be cut out from one parity group 302, or a plurality of logical chunks 304 may be cut out.

In addition, for example, when the data protection policy is 4D1P, ⅘ of the total amount of the physical chunks 301 allocated to the parity group 302 can be used as a data storage area, and ⅕ of the total amount of the physical chunks 301 allocated to the parity group 302 can be used as a parity storage area. That is, the maximum capacity that can be cut out as the logical chunk 304 differs depending on the data protection policy.

The cut out logical chunk 304 is attached to the storage pool 305. The storage pool 305 is configured to include one or more logical chunks 304. A virtual volume 306 used by an application 311 is cut out from the storage pool 305. That is, a storage program 303 allocates the capacity according to the user's request as the virtual volume 306 instead of allocating the capacity to the drive 214.

For example, when receiving a write request from the application 311, in the case of a new write, the storage program 303 allocates a page 307 of the virtual volume 306, more specifically, the physical area of the physical chunk 301 associated with the page 307. The page 307 is associated with a page 308 of the logical chunk 304. In the case of an update write, the storage program 303 specifies the physical area of the physical chunk 301 associated with the allocated page 307 and updates the data. The write request data (or intermediate data described later) is transmitted to another node 100 related to data redundancy and the parity is updated.

In this way, the storage program 303 manages the drive 214 as a shared storage pool 305 and allocates capacity to the drive 214 according to the amount of data written in the virtual volume 306. This eliminates waste of the unused drive 214 and enables efficient operation. In the following, the description will be mainly made to an example in which the data is stored in the drive 214 (local drive) of the node 100 that has received the write request when updating the data. That is, the following mainly describes a configuration that maintains data locality and eliminates network overhead at the time of reading.

The application 311 for accessing the data may be provided and operated in the host node 300, may be provided and operated in the same node 100 as the storage program 303, or may be provided and operated in another node 100.

Figure 4:
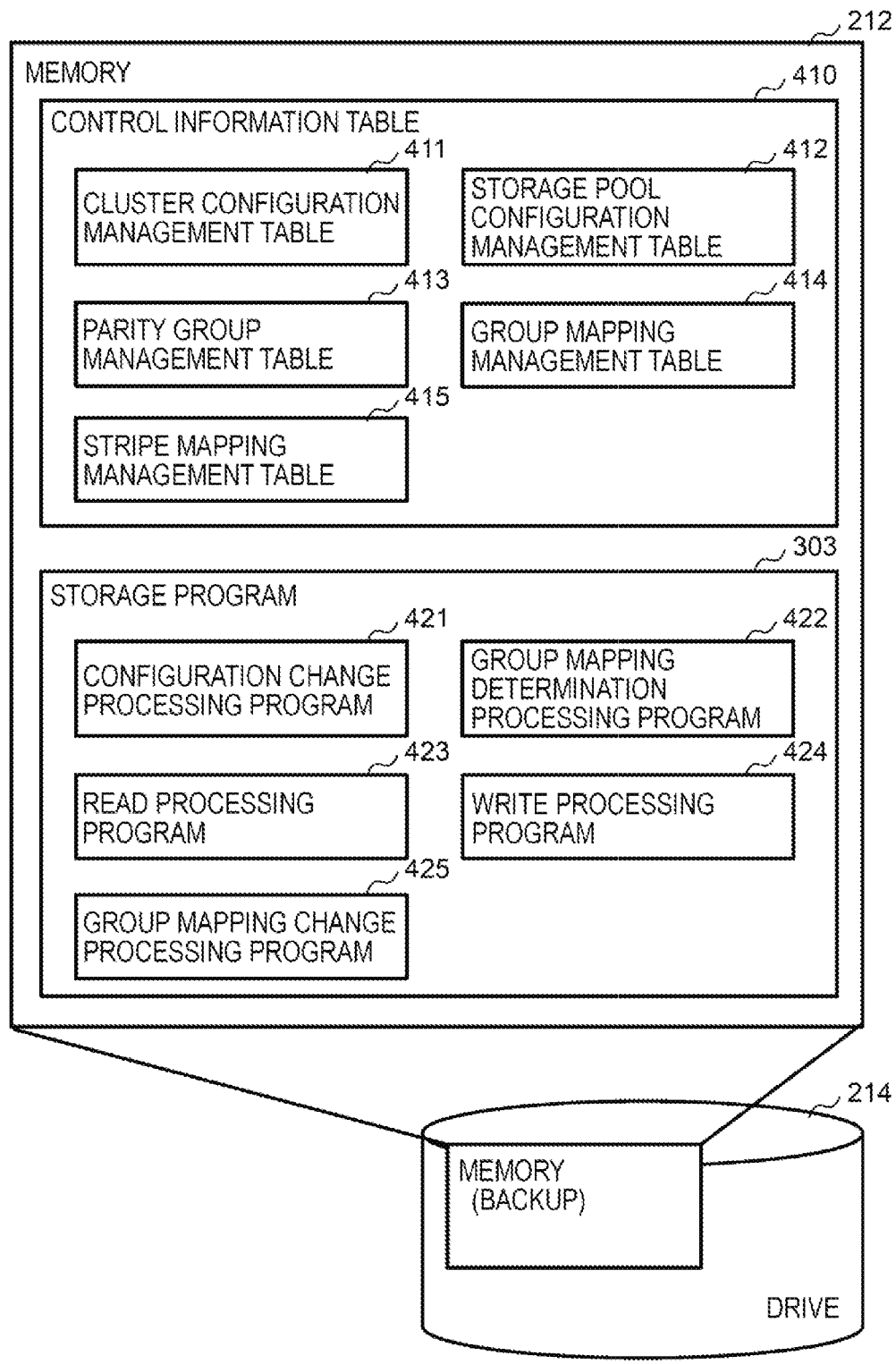
FIG. 4 is a diagram showing an example of information in a memory according to the first embodiment.

FIG. 4 is a diagram showing an example of information in the memory 212, in other words, information read from the drive 214 to the memory 212. A control information table 410 and various programs (such as the storage program 303) are loaded on the memory 212 during execution but are stored in a non-volatile area such as the drive 214 in preparation for a power outage or the like.

The control information table 410 includes a cluster configuration management table 411, a storage pool configuration management table 412, a parity group management table 413, a group mapping management table 414, and a stripe mapping management table 415. Each table will be described later with reference to FIGS. 5 to 8 and 10.

The storage program 303 includes a configuration change processing program 421, a group mapping determination processing program 422, a read processing program 423, a write processing program 424, and a group mapping change processing program 425. The storage program 303 may be realized by, for example, the processor 211 reading the program stored in the drive 214 into the memory 212 and executing the program, that is, by software processing. Further, at least a part of the storage program 303 may be realized by hardware such as a dedicated circuit or may be realized by combining software and hardware. Furthermore, at least a part of the storage program 303 may be realized by another computer capable of communicating with the node 100.

Figure 5:
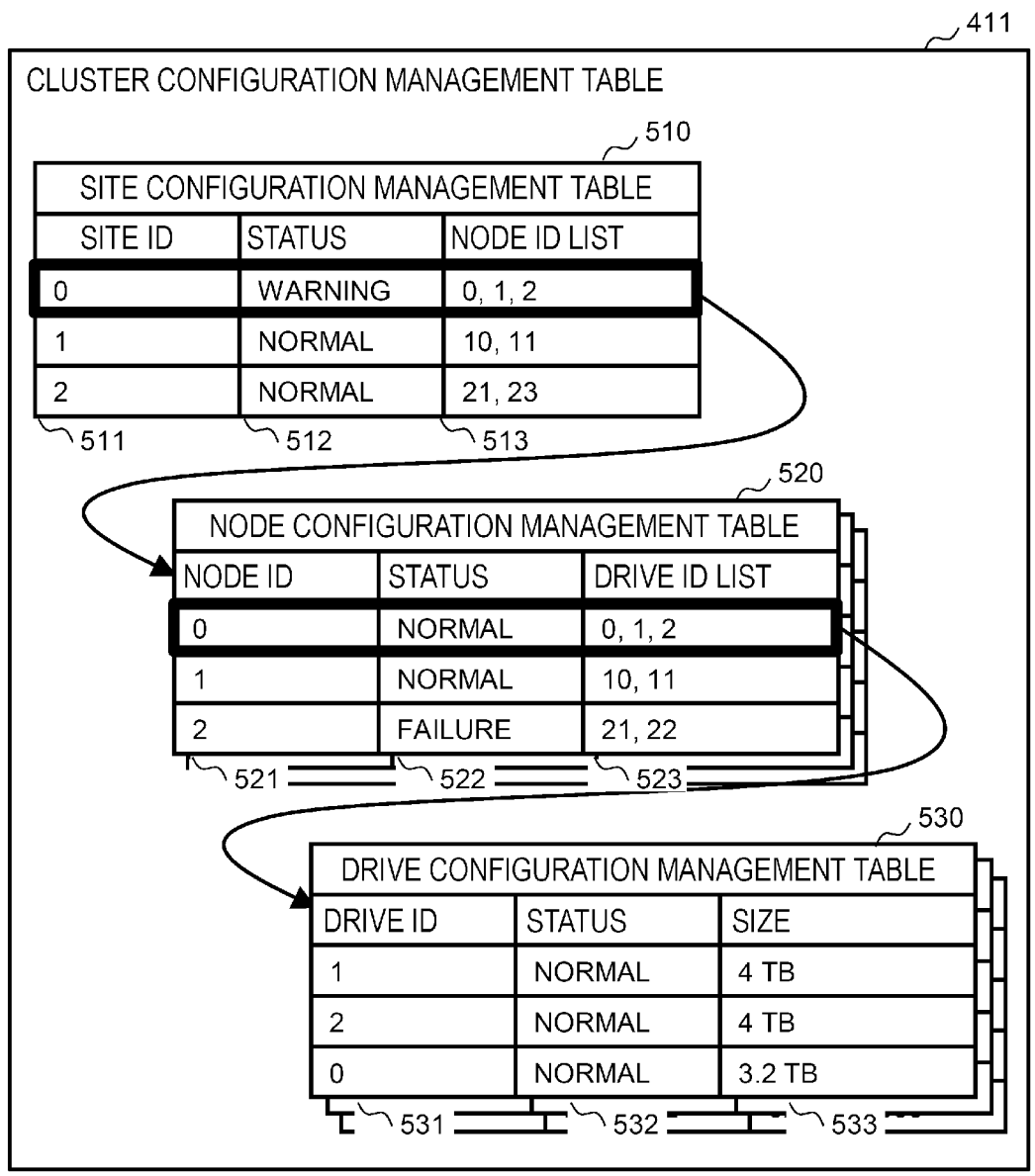
FIG. 5 is a diagram showing an example of a cluster configuration management table according to the first embodiment.

FIG. 5 is a diagram showing an example of the cluster configuration management table 411. The cluster configuration management table 411 stores information for managing the configurations of the site 201, the node 100, and the drive 214.

The cluster configuration management table 411 includes a site configuration management table 510, a node configuration management table 520, and a drive configuration management table 530. The storage system 101 manages the site configuration management table 510, the site 201 manages a plurality of node configuration management tables 520 in the site 201, and the node 100 manages a plurality of drive configuration management tables 530 in the node 100.

The site configuration management table 510 stores the configuration related to the site 201, for example, information indicating the relationship between the site 201 and the node 100. More specifically, the site configuration management table 510 stores information in which a site ID 511, a status 512, and a node ID list 513 are associated with each other. The site ID 511 is identification information that can identify the site 201. The status 512 is status information indicating the status of the site 201, such as NORMAL, WARNING, FAILURE, or the like. The node ID list 513 is identification information that can identify the node 100 provided in the site 201.

The node configuration management table 520 is provided for each site 201 and stores the configuration related to the node 100 provided at the site 201, for example, information indicating the relationship between the node 100 and the drive 214. More specifically, the node configuration management table 520 stores information in which a node ID 521, a status 522, and a drive ID list 523 are associated with each other. The node ID 521 is identification information that can identify the node 100. The status 522 is status information indicating the status of the node 100, such as NORMAL, WARNING, FAILURE, or the like. The drive ID list 523 is identification information that can identify the drive 214 provided in the node 100.

The drive configuration management table 530 is provided for each node 100 and stores information indicating the configuration of the drive 214 provided in the node 100. More specifically, the drive configuration management table 530 stores information in which a drive ID 531, a status 532, and a size 533 are associated with each other. The drive ID 531 is identification information that can identify the drive 214. The status 532 is status information indicating the status of the drive 214, such as NORMAL, WARNING, FAILURE, or the like. The size 533 is a value indicating the capacity of the drive 214, for example, in TB (terabyte) or GB (gigabyte) units.

Figure 6:
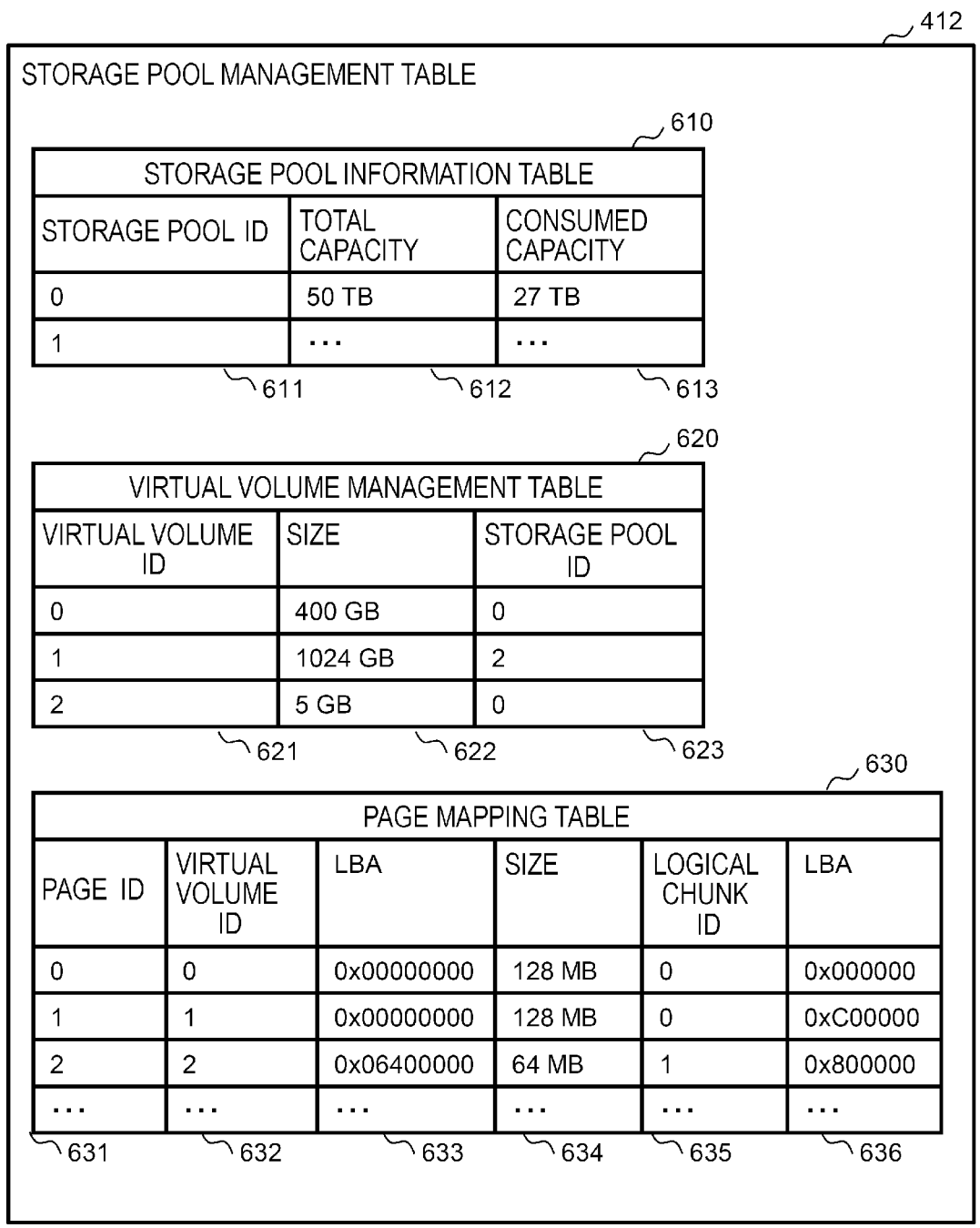
FIG. 6 is a diagram showing an example of a storage pool configuration management table according to the first embodiment.

FIG. 6 is a diagram showing an example of the storage pool configuration management table 412. The storage pool configuration management table 412 stores control information for the thin provisioning function provided by the storage pool 305. The storage pool configuration management table 412 is configured to include a storage pool information table 610, a virtual volume management table 620, and a page mapping table 630.

The storage pool information table 610 stores information related to the storage pool 305. More specifically, the storage pool information table 610 stores information in which a storage pool ID 611, a total capacity 612, and a consumed capacity 613 are associated with each other. The storage pool ID 611 is identification information that can identify the storage pool 305. The total capacity 612 is a value indicating the total capacity of the storage pool 305, for example, in TB or GB units. The consumed capacity 613 is a value indicating the capacity consumed in the storage pool 305, for example, in TB or GB units.

The virtual volume management table 620 stores information related to the virtual volume 306 (such as information indicating the correspondence relationship between the virtual volume 306 and the storage pool 305 to which the virtual volume 306 is allocated). More specifically, the virtual volume management table 620 stores information in which a virtual volume ID 621, a size 622, and a storage pool ID 623 are associated with each other.

The virtual volume ID 621 is identification information that can identify the virtual volume 306. The size 622 is a value indicating the capacity of the virtual volume 306, for example, in TB or GB units. The storage pool ID 623 is identification information that can identify the storage pool 305 to which the virtual volume 306 belongs.

The page mapping table 630 stores information related to the page 307 allocated to the virtual volume 306, that is, information indicating the correspondence relationship between the page 307 and the logical chunk 304. More specifically, the page mapping table 630 stores information in which a page ID 631, a virtual volume ID 632, a logical block address (LBA) 633, a size 634, a logical chunk ID 635, and an LBA 636 are associated with each other.

The page ID 631 is identification information that can identify the page 307. The virtual volume ID 632 is identification information that can identify the virtual volume 306 to which the page 307 is allocated. The LBA 633 is information that can specify the position of the page 307 in the virtual volume 306, and is, for example, information that indicates the order from the first page 307 of the virtual volume 306. The page 307 is a unit by which the storage program 303 accesses the virtual volume 306. The size 634 is a value indicating the capacity of the page 307, for example, in GB or MB (megabyte) units. The logical chunk ID 635 is identification information that can identify the logical chunk 304 corresponding to the page 307. The LBA 636 is information that can specify the position of the logical chunk 304 in the storage pool 305, and is, for example, information indicating the order from the first logical chunk 304 in the storage pool 305.

The size 634 may be the same for all pages 307 or may be different for each page 307. In addition, the storage program 303 refers to the page mapping table 630 when converting the address of the virtual volume 306 to the address of the storage pool 305. The storage program 360 also allocates a page 307, that is, adds a record to the page mapping table 630, each time a new write is received.

FIG. 7 is a diagram showing an example of the parity group management table 413. The parity group management table 413 stores control information for managing the configuration of the parity group 302, which is configured by combining a physical chunk 301 and a plurality of physical chunks 301, that is, a redundant group. The parity group management table 413 includes a logical chunk management table 710, a parity group management table 720, a physical chunk management table 730, and a free physical chunk list 740.

The logical chunk management table 710 stores information (logical chunk information) related to the logical chunk 304 cut out from the parity group 302. More specifically, the logical chunk management table 710 stores information in which a logical chunk ID 711, the size 712, a parity group ID 713, and mapping change progress information 714 are associated with each other. The logical chunk ID 711 is identification information that can identify the logical chunk 304 cut out from the parity group 310. The size 712 is a value indicating the capacity of the logical chunk 304, for example, in TB or GB units.

The parity group ID 713 is identification information that can identify the parity group 302 to which the logical chunk 304 belongs. During the configuration change, the parity group IDs before and after the configuration change are stored. The mapping change progress information 714 stores migration progress information when the data of the logical chunk 304 is moved to a parity group different from the current one. For example, starting from 0%, a value of 100% is stored at the time of completion. For example, when the migration is sequentially executed from the first LBA of the logical chunk 304, the progress information is calculated as (first LBA for storing currently moving data/maximum LBA of the logical chunk 304)×100.

The parity group management table 720 stores information related to the parity group 302 (parity group information). More specifically, the parity group management table 720 stores information in which a parity group ID 721, a data protection setting 722, and a physical chunk ID 723 are associated with each other.

The parity group ID 721 is identification information that can identify the parity group 302. The data protection setting 722 is a data protection setting of the parity group 302. The physical chunk ID 723 is identification information that can identify the physical chunk 301 allocated to the parity group 302.

The physical chunk management table 730 stores information related to the physical chunk 301, for example, information for cutting out a physical area of the drive 214 from the start offset by the size and managing the physical area as the physical chunk 301. More specifically, the physical chunk management table 730 stores information in which a physical chunk ID 731, a start offset 732, a size 733, and site ID/node ID/drive ID 734 are associated with each other.

The physical chunk ID 731 is identification information that can identify the physical chunk 301. The start offset 732 is information indicating the start position when the physical chunk 301 is cut out from the drive 214. The size 733 is information indicating the capacity of the physical chunk 301, for example, the number of blocks. Here, a block means a unit of access to a storage device and the size of one block is typically 512 bytes. However, the block size is not limited to 512 bytes and may be 4 KB or 8 KB. The site ID/node ID/drive ID 734 indicates identification information that can identify the storage resource from which the physical chunk 301 is cut out, that is, information indicating from which drive 214 of which node 100 of which site 201 the physical chunk 301 is cut out.

The free physical chunk list 740 is a list of identification information that can identify the physical chunks 301 not allocated to the parity group 302 among the physical chunks 301 of the drive 214 in the node 100, for example, a list of physical chunk IDs. In the free physical chunk list 740, the physical chunks 301 are arranged in order starting from the top physical chunk 301 of the drive 214, which consumes less capacity. In other words, the physical chunks 301 in the node 100 are selected from the one with the smallest consumed capacity per drive 214.

FIG. 8 is a diagram showing an example of the group mapping management table 414. The group mapping management table 414 stores control information for managing a combination of nodes for forming the parity group 302. The group mapping management table 414 is configured to include a mapping management table 810, a mapping division management table 820, and a correspondence management table 830.

The mapping management table 810 stores information related to the mapping of the parity group 302, for example, information for determining a combination of column IDs for forming a parity group for a distributed RAID configured with a certain number of columns. The mapping management table 810 shows an example of forming a parity group with 2D1P, that is, three columns. More specifically, the mapping management table 810 stores information in which a group map ID 811, the number of columns 812, a location ID 813, and grouping information 814 are associated with each other.

The group map ID 811 is identification information that can identify the map that determines the combination of the parity groups 302. The group map ID 811 stores at least one piece of information for each number of columns. The number of columns is information indicating the number of columns that form the group map, that is, the number of columns. The location ID 813 is identification information that can identify a location, which is information that determines a combination of column IDs in the associated group map. The grouping information 814 is information indicating a combination of column IDs.

The mapping division management table 820 stores information related to the division of the group map, that is, information for determining the number of nodes forming a cluster and the number of divisions of the group map. More specifically, the mapping division management table 820 stores information in which the number of nodes 821, the number of map divisions 822, and map division information 823 are associated with each other.

The number of nodes 821 is information indicating the number of nodes forming a cluster. The number of map divisions 822 is information indicating the number of group maps applied to the nodes forming the cluster. The map division information 823 is information indicating a combination of the numbers of columns of the group maps applied to the nodes forming the cluster. For example, when the map division information 823 stores information (5, 5, 6) for a cluster constituted of 16 nodes, two group maps configured of five columns and one group map configured of six columns are used to determine a combination forming a parity group with respect to the nodes forming the cluster.

The correspondence management table 830 stores information related to correspondence information between nodes and group map information. More specifically, the correspondence management table 830 stores information in which a node ID 831, a group map ID 832, an index ID 833, and a column ID 834 are associated with each other. The node ID 831 is identification information that can identify the node 100. The group map ID 832 is the same as the group map ID 811 in the mapping management table 810. The index ID 833 is an identification number that can identify the applied group map ID when the same group map ID is applied to the cluster. The column ID 834 is information that associates the column ID indicated by the grouping information 814 stored in the mapping management table 810 with the node ID 831.

FIG. 9 is a conceptual diagram illustrating a mapping changing method in group mapping management. More specifically, a method of dividing the group mapping and managing the mapping when the cluster is expanded from 7 nodes to 8 nodes is described. In FIG. 9, the visibility is emphasized for easy understanding, but the information shown in FIG. 9 is the information stored in the table described so far.

The node-group correspondence information 901 indicates information in a cluster constituted of 7 nodes. The node-group correspondence information 901 associates information with a group map ID of 4 and an index ID of 0. In the node-group correspondence information 901, nodes with node IDs N1, N2, . . . , N7 are associated with columns with column IDs C0, C1, . . . , C6 shown in a location column correspondence table 902. That is, the node-group correspondence information 901 represents the information stored in the correspondence management table 830 in an expression different from that of FIG. 10.

The location column correspondence table 902 shows column ID combination information when a parity group is configured with three columns in a configuration with seven columns. The location ID indicates the information of each combination. For example, in the combination of the location ID of 0, the combination of the column IDs of C0, C1, and C2 constitutes the parity group. When the combination of the location ID 0 is replaced with the node ID, the parity group is configured with the combination of the node IDs N1, N2, and N3. For location IDs 1 to 6, combinations of parity groups are shown in the same manner.

The location column correspondence table 902 in FIG. 9 visually shows the relationship between the location ID 813 and the column ID when the number of columns 812 in the mapping management table 810 is "7".

The node-group correspondence information 903 indicates information in a cluster constituted of 8 nodes. In the node-group correspondence information 903, information having a group map ID of 1 and an index ID of 0 is associated with the nodes having node IDs N1 to N4. Further, in the node-group correspondence information 903, the nodes with node IDs N1, N2, N3, and N4 are associated with the columns with column IDs C0, C1, C2, and C3 shown in the location column correspondence table 902.

Further, in the node-group correspondence information 903, information having a group map ID of 1 and an index ID of 1 is associated with the nodes with node IDs N5 to N8. Further, in the node-group correspondence information 903, the nodes with node IDs N5, N6, N7, and N8 are associated with the columns with column IDs C0, C1, C2, and C3 shown in the location column correspondence table 902.

The location column correspondence table 904 shows column ID combination information when a parity group is configured with three columns in a configuration with four columns. The location ID indicates the information of each combination. For example, in the combination of the location ID of 0, the combination of the column IDs of C0, C1, and C2 constitutes the parity group. When the combination of location ID 0 is replaced with the node ID, in a set corresponding to index 0, a parity group is configured with a combination of node IDs N1, N2, and N3. In a set corresponding to index 1, a parity group is configured with a combination of node IDs N5, N6, and N7. For location IDs 1 to 3, combinations of parity groups are shown in the same manner.

The location column correspondence table 904 of FIG. 9 visually shows the relationship between the location ID 813 and the column ID when the number of columns 812 in the mapping management table 810 is "4".

FIG. 10 is a diagram showing an example of the stripe mapping management table 415. The stripe mapping management table 415 stores information for managing the arrangement of data and parity in the parity group 302. More specifically, the stripe mapping management table 415 stores information indicating which data or parity of the parity group 302 is stored in each segment (element) identified by a column and a row.

For example, it is shown that the segment 1001 "A1" identified by "Column0" and "Row0" stores the data of the parity group 302 of "GroupA". It is shown that the segment 1002 "A2" identified by "Column1" and "Row0" stores the data of the parity group 302 of "Group A". It is shown that the segment 1003 "AP" identified by "Column3" and "Row0" stores the parity of the parity group 302 of "GroupA". A combination of the segment 1001 "A1", the segment 1002 "A2", and the segment 1003 "AP", which indicate the parity group 302 "Group A", is appropriately referred to as "stripe".

Here, as shown in a configuration unit 1010, the unit of mapping change processing is referred to as a "frame". As shown in a configuration unit 1020, when one offset is configured by one parity group 302, the unit indicating the one offset is called a "chunk". As shown in a configuration unit 1030, when one offset is configured by one parity group 302, the unit managed by the stripe mapping management table 415 is called "cycle".

Further, the stripe mapping management table 415 shows an example when the data protection policy is "2D1P", and when the data protection policy changes, the contents of the stripe mapping management table 415 are changed.

Further, preferably, the stripe mapping management table 415 is set such that the storage ratio of data and parity per physical chunk 301 in a certain parity group 302 is data:parity=m:n when the data protection policy is mDnP. Since the parity is frequently updated, if the parity is biasedly stored in a certain node 100, the load is biased on the node 100. However, by determining the storage ratio as described above, it becomes possible to equalize the load on each node 100.

Here, the stripe mapping management table 415 is used to specify the physical LBA (redundancy destination) of the parity area with respect to the physical LBA of a certain data area. As a method for specifying the redundancy destination, for example, the following method can be mentioned. As a first step, the column ID=0 is assigned from the beginning of the list of the mapping management table 810. As a second step, the corresponding column ID is acquired from the access destination group ID and node ID. As a third step, Row is calculated from the access destination LBA. For example, the following Equation 1 can be used for this calculation.

$$\text{Row ID} = \text{LBA} \bmod \text{Rowmax} \qquad \text{Equation 1}$$

Figure 12:
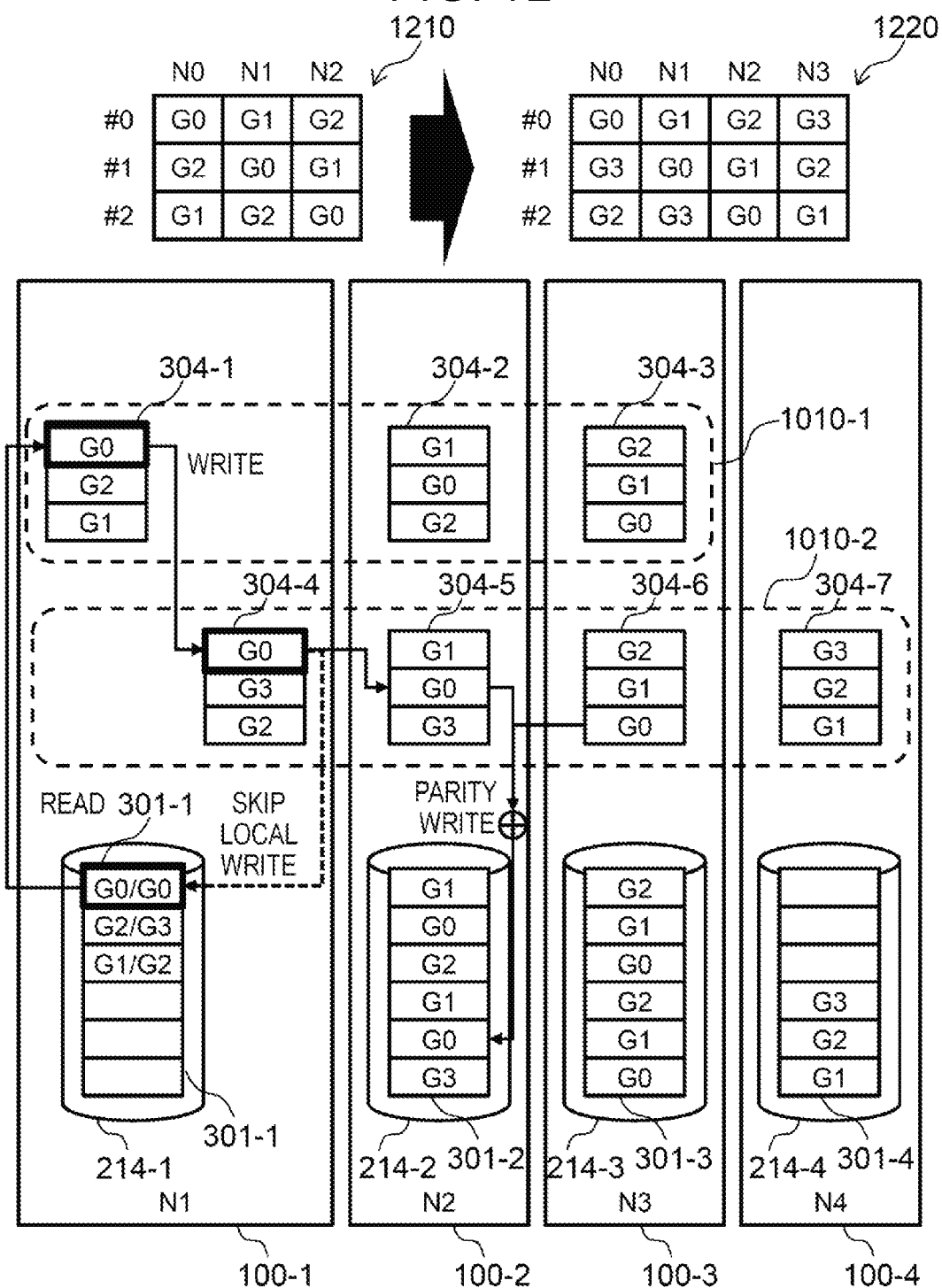
FIG. 12 is a schematic diagram of parity recalculation according to the first embodiment.

Rowmax is "3" in the example of the stripe mapping management table 415 shown in FIG. 12. As a fourth step, when the Row and the Column on the data side can be specified, the Row and the Column on the corresponding xP (parity side) are acquired. As a fifth step, the node ID on the parity side and the physical LBA are calculated. For example, the following Equation 2 can be used for this calculation.

$$\text{LBA}p = \text{LBA}d + \text{Ssize} \times \text{Row ID} \qquad \text{Equation 2}$$

Ssize in Equation 2 is the size of the segment. Further, the method for specifying the data location from the parity location in the data restoration processing is the reverse procedure of the above.

Figure 11:
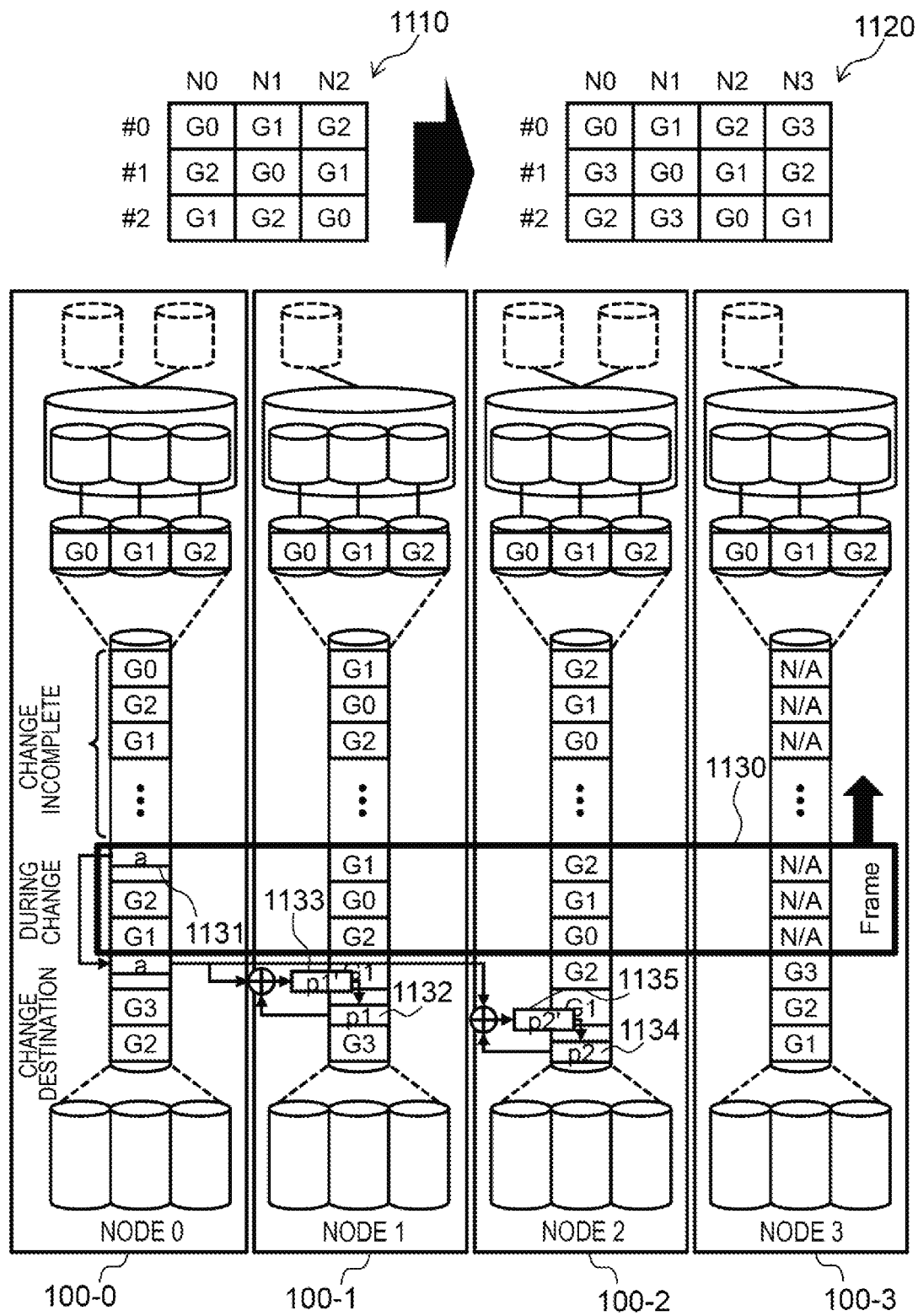
FIG. 11 is a schematic diagram of a mapping change according to the first embodiment.

FIG. 11 is a schematic diagram of mapping change. In FIG. 11, the location node correspondence table indicated by reference numerals 1110 and 1120 is information indicating the correspondence between the combination of the location ID and the node, and the parity group, and can also be called "mapping information". The location node correspondence table is a table that can be created by combining the mapping management table 810 and the correspondence management table 830 and that visually represents the relationship between the combination of the location ID and the node ID, and the parity group in an easily understandable manner. The location node correspondence table is described only for the convenience of description and the location node correspondence table per se does not need to be stored in the memory 212. In FIG. 11, as shown in the location node correspondence table 1110 and the location node correspondence table 1120, a case where the node 100 (node 100-3) of "N3" is added will be described as an example.

As shown in the location node correspondence table 1120, "G3" is added as a new parity group 302 by adding a node. In the storage system 101, the offset in the node 100 is used from the upper offset, and therefore the mapping is changed using the unused lowest offset. After switching the mapping of the unused offset, the data is copied from the area of the physical chunk 301 at the same location in the frame of the upper offset. The parity is calculated and built by the occasion of copying. This migration of data is data migration within the node 100, and therefore data locality is not lost.

For example, when the data 1131 of the migration source chunk forming the "G0" parity group 302 is copied to the migration destination chunk, data 1131 is transmitted to another node 100 (node 100-1, node 100-2) that configures the "G0" parity group 302. The node 100-1 that has received the data 1131 calculates and stores the new parity 1133 using the transmitted data 1131 and the old parity 1132. Further, the node 100-2 that has received the data 1131 calculates and stores the new parity 1135 using the transmitted data 1131 and the old parity 1134. In the above-described data migration, the storage pool 305 does not recognize that the data has moved before and after the data migration.

FIG. 12 is a conceptual diagram of parity recalculation in the group mapping change processing. A case where "N3" is added (node addition) to a cluster with three nodes and expanded to a cluster with four nodes will be described. More specifically, the arrangement of parity groups is converted from the location node correspondence table 1210 before the configuration change to the location node correspondence table 1220 after the configuration change.

An arrangement converting method of parity groups will be described. The frame in which the parity group is arranged based on the location node correspondence table 1210 before the configuration change is set as a migration source frame 1010-1. Further, the frame in which the parity group is arranged based on the location node correspondence table 1220 after the configuration change is set as a migration source frame 1010-2. The arrangement of the parity group is converted by copying the data from the parity group in the migration destination frame to the parity group in the migration source frame.

At this time, the data locality is maintained by copying the data in the same node and converting the arrangement of the parity group. At this time, since it is only necessary to recalculate the parity, the write operation to the migration destination parity group is skipped by sharing the data part of the physical chunk between the migration destination parity group and the migration source parity group. As a result, the drive load during data migration can be reduced. More specifically, the physical chunk 301 cut out from the drive 214-1 is used to define the logical chunk 304-1 of the migration source parity group. Further, in the same manner, the physical chunk 301 cut out from the drive 214-1 is used to define the logical chunk 304-1 of the migration destination parity group.

Since the physical chunk of the migration source parity group and the physical chunk of the migration destination parity group have the same data, copying of data can be skipped in this way. When copying the data, the data read from the migration destination chunk 301-1 is transmitted to another node for parity recalculation and the parity is recalculated and stored in the combination of the migration destination parity groups. Explaining a specific example when copying data, for example, when storing the parity in the node 100-2, the data read from the migration destination chunk 301-1 is transmitted to the node 100-2, and the parity is recalculated and stored in a combination of G0 of 304-4, G0 of 304-5 and G0 of 304-6.

Figure 13:
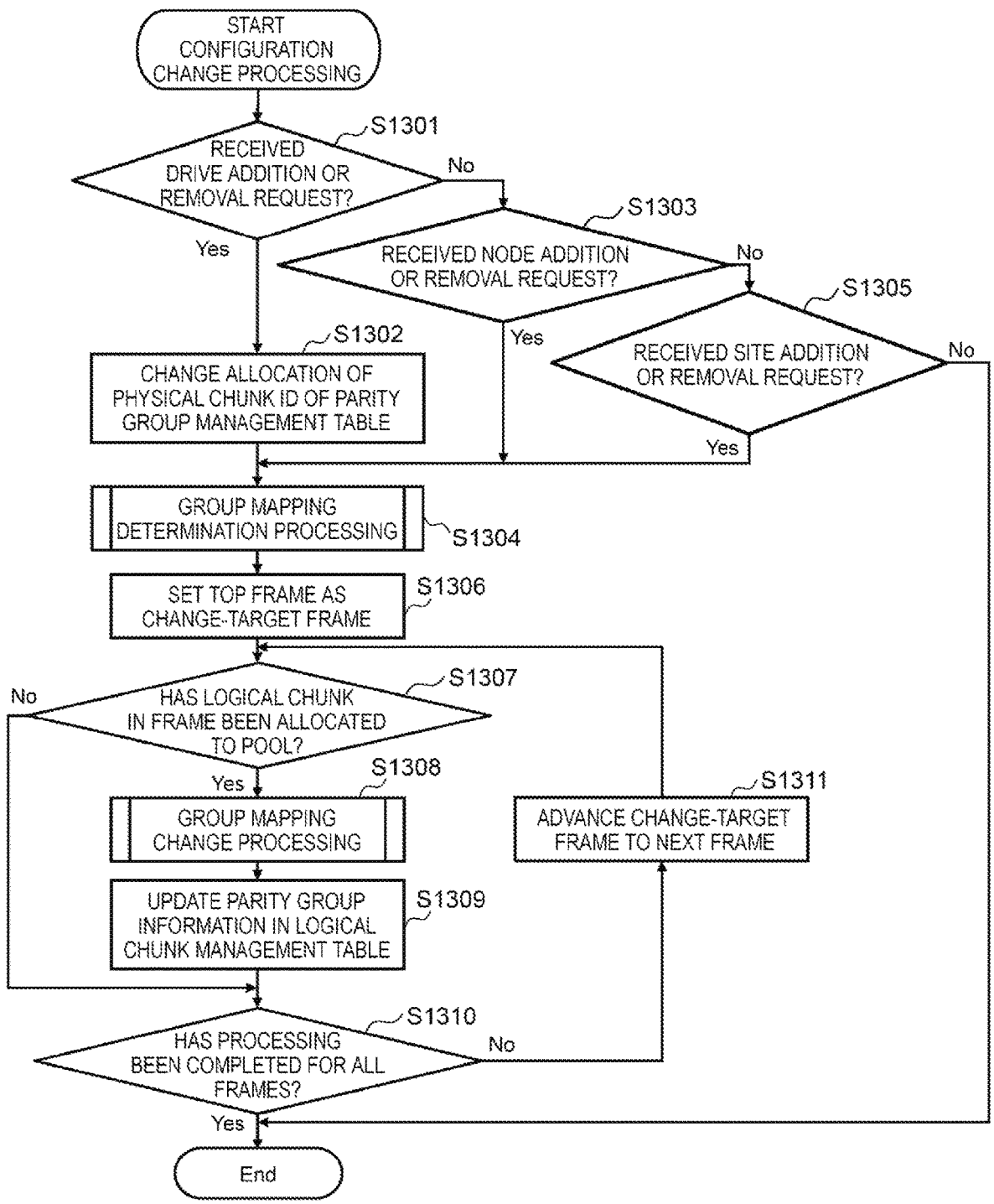
FIG. 13 is a diagram showing an example of a flowchart related to configuration change processing according to the first embodiment.

FIG. 13 is a diagram showing an example of a flowchart related to the configuration change processing. In the configuration change processing, a mapping change request is issued to each node 100 in frame units based on the configuration change instruction. The configuration change processing is executed within the storage program 303. The execution may be executed periodically or may be executed in response to an operation reception from the user. Further, when a node failure or a drive failure having the redundancy (p) or less occurs, the change processing is continued (rolled forward), and then the failed part is replaced to restore the normal state. When a failure due to an abnormality in redundancy occurs, the change processing is stopped. With respect to the faulty part, the access is continued by the collection access and the mapping change processing is continued.

In step S1301, the configuration change processing program 421 determines whether or not an instruction to add or remove the drive 214 (drive addition or removal instruction) has been received. The configuration change processing program 421 shifts the process to step S1302 when it is determined that the instruction has been received, and shifts the process to step S1303 when it is determined that the instruction has not been received.

In step S1302, the configuration change processing program 421 changes the allocation of the physical chunk ID in the parity group management table 720. When the drive 214 is added or removed, the configuration change processing program 421 changes the physical chunk 301 allocated to the parity group 302 in the node 100 and moves the data and parity in the node 100 between the drives 214 (data migration) to change the configuration. At this time, for example, the configuration change processing program 421 may move data by changing the allocation so that the capacities of the respective drives 214 are equalized, or may move data by changing the allocation so that the IO loads of the respective drives 214 are equalized. When the drive 214 is added, the configuration change processing program 421 may be added to the free physical chunk list 740 without changing the allocation of the physical chunk management table 730 in the node.

In step S1303, the configuration change processing program 421 determines whether or not an instruction to add or remove the node 100 (node addition or removal instruction) has been received. The configuration change processing program 421 shifts the process to step S1304 when it is determined that the instruction has been received, and proceeds the process to step S1305 when it is determined that the instruction has not been received.

In step S1304, the configuration change processing program 421 executes group mapping determination processing, recalculates arrangement information of data and parity, and shifts the process to step S1306. The group mapping determination processing will be described later with reference to FIG. 14.

In step S1305, the configuration change processing program 421 determines whether or not an instruction to add or remove the site 201 (site addition or removal instruction) has been received. The configuration change processing program 421 shifts the process to step S1304 when it is determined that the instruction has been received, and ends the configuration change processing when it is determined that the instruction has not been received.

In step S1306, the configuration change processing program 421 sets the top frame as the frame whose mapping is to be changed. In step S1307, the configuration change processing program 421 determines whether or not the logical chunk 304 in the frame has been allocated to the storage pool 305. The configuration change processing program 421 shifts the process to step S1308 when it is determined that the allocation has been made, and shifts the process to step S1310 when it is determined that the allocation has not been made. By thus targeting only the area allocated to the storage pool 305, it is possible to reduce the transfer cost between the nodes 100 when the configuration is changed.

In step S1308, the configuration change processing program 421 performs group mapping change processing. In the group mapping change processing, a mapping change request is transmitted to each node 100. The group mapping change processing will be described later with reference to FIG. 19. In the subsequent step S1309, the configuration change processing program 421 reflects the new mapping management table 810 in the parity group management table 413.

In step S1310, the configuration change processing program 421 determines whether or not the processing has been completed for all frames. The configuration change processing program 421 ends the configuration change processing when it is determined that the processing has been completed, and shifts the process to step S1311 when it is determined that the processing has not been completed. In step S1311, the configuration change processing program 421 advances the frame for which mapping is to be changed to the next frame, and shifts the process to step S1307.

Figure 14:
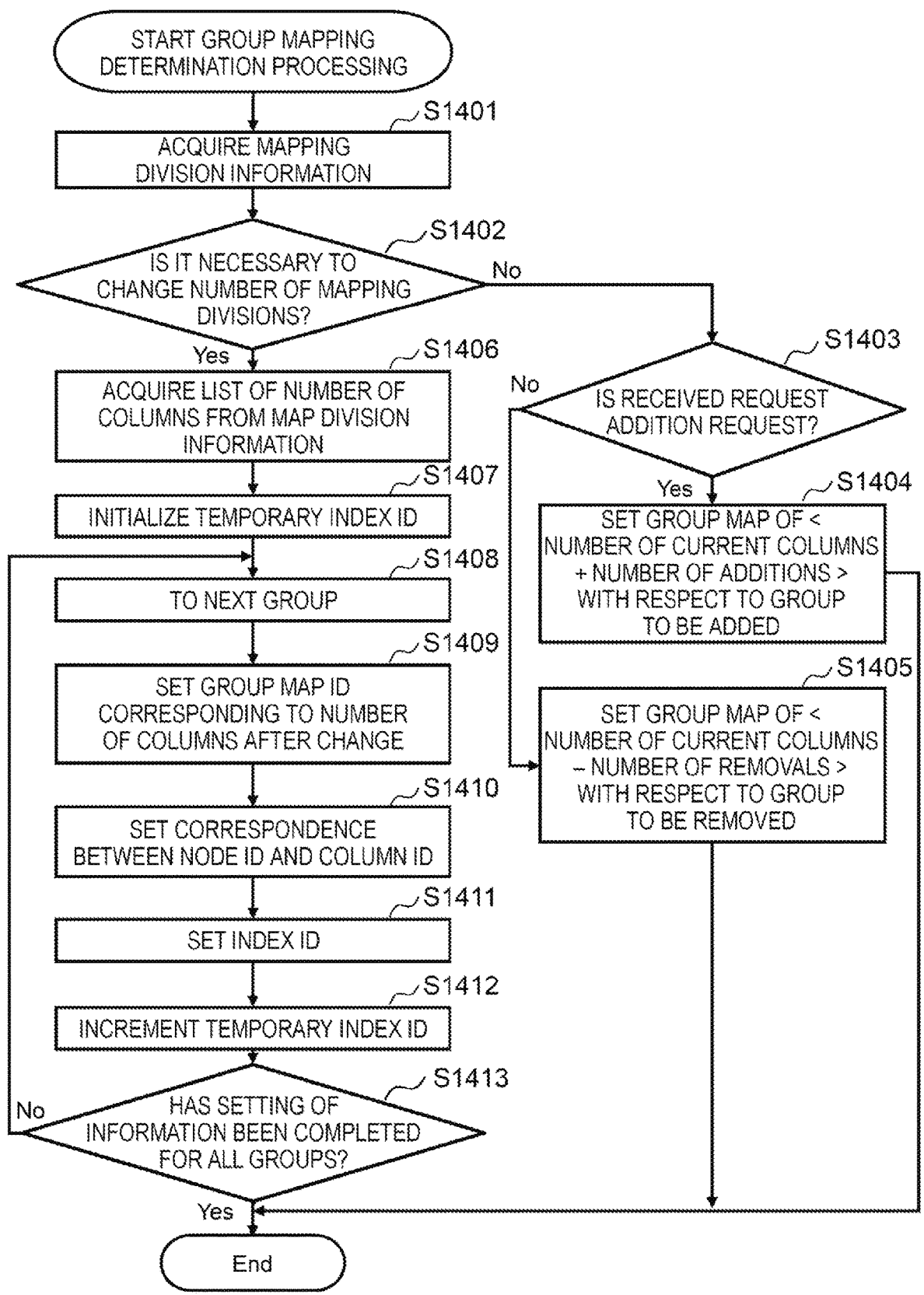
FIG. 14 is a diagram showing an example of a flowchart related to group mapping determination processing according to the first embodiment.

FIG. 14 is a diagram showing details of step S1304 in FIG. 13, that is, an example of a flowchart related to the group mapping determination processing. In the group mapping determination processing, the group mapping (group map ID) to be applied is determined by referring to the mapping management table 810 from the number of nodes after the configuration change and the information of the mapping division management table 820. The details will be described below.

In step S1401, the group mapping determination processing program 422 refers to the mapping division management table 820 and acquires the mapping division information. In step S1402, the group mapping determination processing program 422 determines whether or not mapping division is necessary. The group mapping determination processing program 422 can use the following method for the determination, for example. First, it may be determined whether or not the number of columns after addition or removal exceeds or falls below a threshold value in the number of nodes in which the number of map divisions 822 is different before and after, for example, the number of nodes in the mapping division management table 820 with 15 or 16 as the threshold value.

Secondly, it may be determined whether the number of divisions differs depending on the number of nodes before and after the configuration change. Thirdly, the capacity per node for maintaining reliability is registered as a threshold in the system, and whether or not the capacity per group exceeds or falls below the threshold may be determined with reference to the cluster configuration management table 411. Further, the above-mentioned first to third methods may be combined. For example, the second and the third may be combined and the determination may be made based on the combination of the number of nodes and the capacity per group. The group mapping determination processing program 422 shifts the process to step S1406 when it is determined that the number of divisions of the mapping needs to be changed and shifts the process to step S1403 when it is determined that the number of divisions of the mapping needs not to be changed.

In step S1403, the group mapping determination processing program 422 determines whether or not the received request for the configuration change operation is an expansion request. The group mapping determination processing program 422 shifts the process to step S1404 when the request is an expansion request, and when the request is not an expansion request, the group mapping determination processing program 422 determines that the request is a removal request and shifts the process to step S1405.

In step S1404, for the group to be added, the group mapping determination processing program 422 sets the group map ID of the number of columns matching the number of columns that is the sum of the current number of columns and the number of added nodes as the map after the configuration change. Then, the group mapping determination processing ends.

In step S1405, for the group to be removed, the group mapping determination processing program 422 sets the group map ID of the number of columns matching the number of columns that is "the current number of columns—the number of removed nodes" as the map after the configuration change. Then, the group mapping determination processing ends.

In step S1406, the group mapping determination processing program 422 refers to the map division information of the mapping division management table and acquires a list of the number of columns after division. Hereinafter, the elements in this column list are referred to as a group for description. In step S1407, the group mapping determination processing program 422 initializes the temporary index ID used for control to 0.

In step S1408, the group mapping determination processing program 422 acquires the group to be updated next from the list. In step S1409, the group mapping determination processing program 422 sets the group map ID corresponding to the number of columns assigned to the group in the correspondence management table 830.

In step S1410, the group mapping determination processing program 422 sets the correspondence between the node ID and the column ID in the correspondence management table 830. In step S1411, the group mapping determination processing program 422 sets the index ID of the correspondence management table 830 with the current value of the temporary index ID. In step S1412, the group mapping determination processing program 422 increments the temporary index ID, that is, adds 1 to the current value.

In step S1413, the group mapping determination processing program 422 determines whether or not the information setting has been completed for all the groups acquired in step S1406. When it is determined that the information setting has not been completed for all groups, the group mapping determination processing program 422 shifts the process to step S1408 and sets information for the next group. When the group mapping determination processing program 422 determines that the information setting has been completed for all groups, the group mapping determination processing ends.

Figure 15:
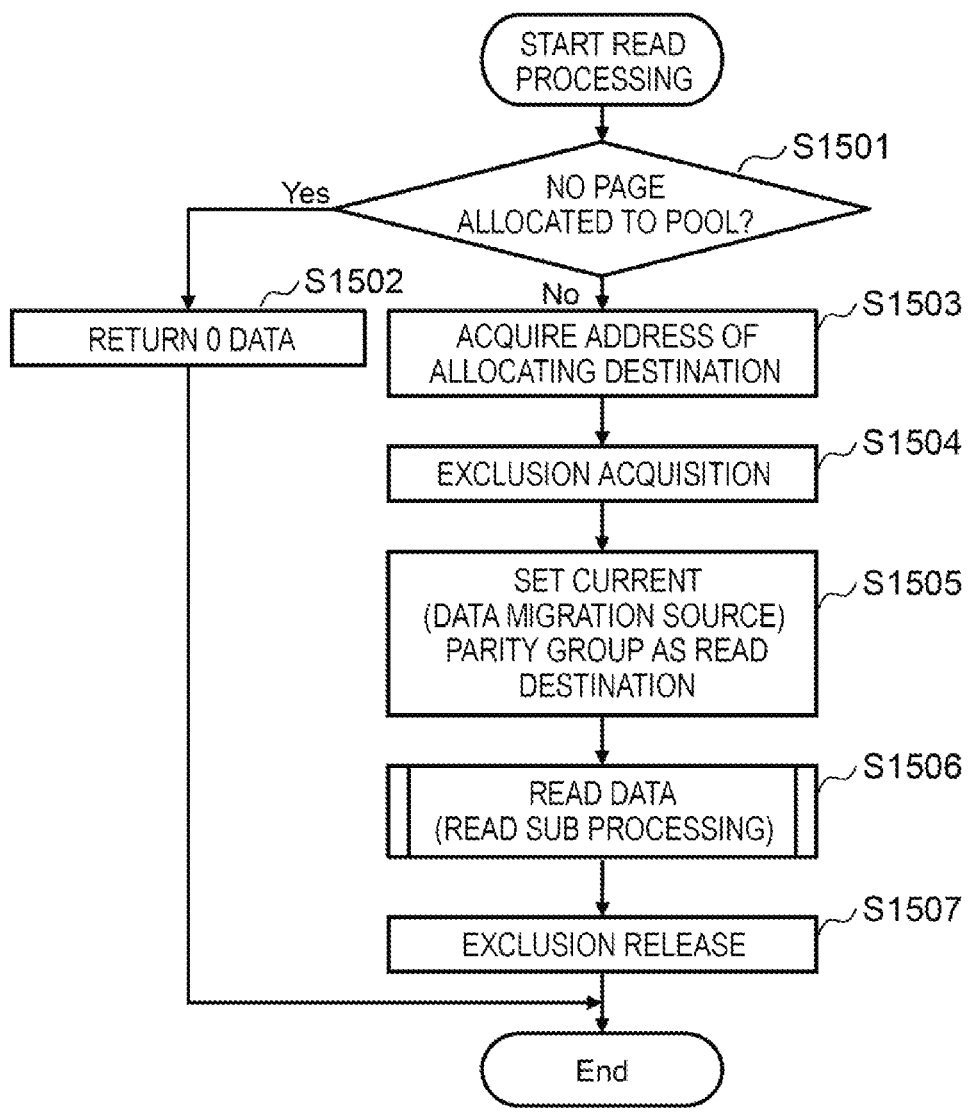
FIG. 15 is a diagram showing an example of a flowchart related to read processing according to the first embodiment.

FIG. 15 is a diagram showing an example of a flow chart related to the read processing. In the read processing, a request to read data, that is, a read request is received from the application 311 and the data is read from the drive 214 of the own node 100. When the access destination area (drive 214) is in a failure state, the read target data is restored from the redundant data and a response is returned. The application 311 specifies the address of the virtual volume in which the read target data exists together with the read request. The details will be described below.

In step S1501, the read processing program 423 determines whether or not the page 307 has not been allocated to the storage pool 305 for the read request data. The read processing program 423 shifts the process to step S1502 when it is determined that the page has not been allocated, and shifts the process to step S1503 when it is determined that the page has been allocated. In step S1502, the read processing program 423 returns 0 data indicating that there is no data to the application 311 and ends the read processing.

In step S1503, the read processing program 423 acquires the address of the allocating destination. In step S1504, the read processing program 423 performs exclusion acquisition. In exclusion acquisition, an exclusive algorithm such as a mutex is used for the logical block address (LBA) of the access destination so that multiple processes do not simultaneously access the same area. Similar processing is performed for the subsequent exclusive processing.

In step S1505, the read processing program 423 refers to the logical chunk management table 710 of the parity group management table 413 and sets the current parity group ID as a read target. When the configuration change processing is operating and data migration is in progress, the read processing program 423 sets the parity group ID of the data migration source as the read target.

In step S1506, the read processing program 423 executes read sub processing to read data from the drive. Details of the read sub processing will be described with reference to FIG. 16. Further, the read processing program 423 responds to the application 311 with the data returned by the read sub processing. In step S1507, the read processing program 423 performs exclusion release and ends the read processing.

Figure 16:
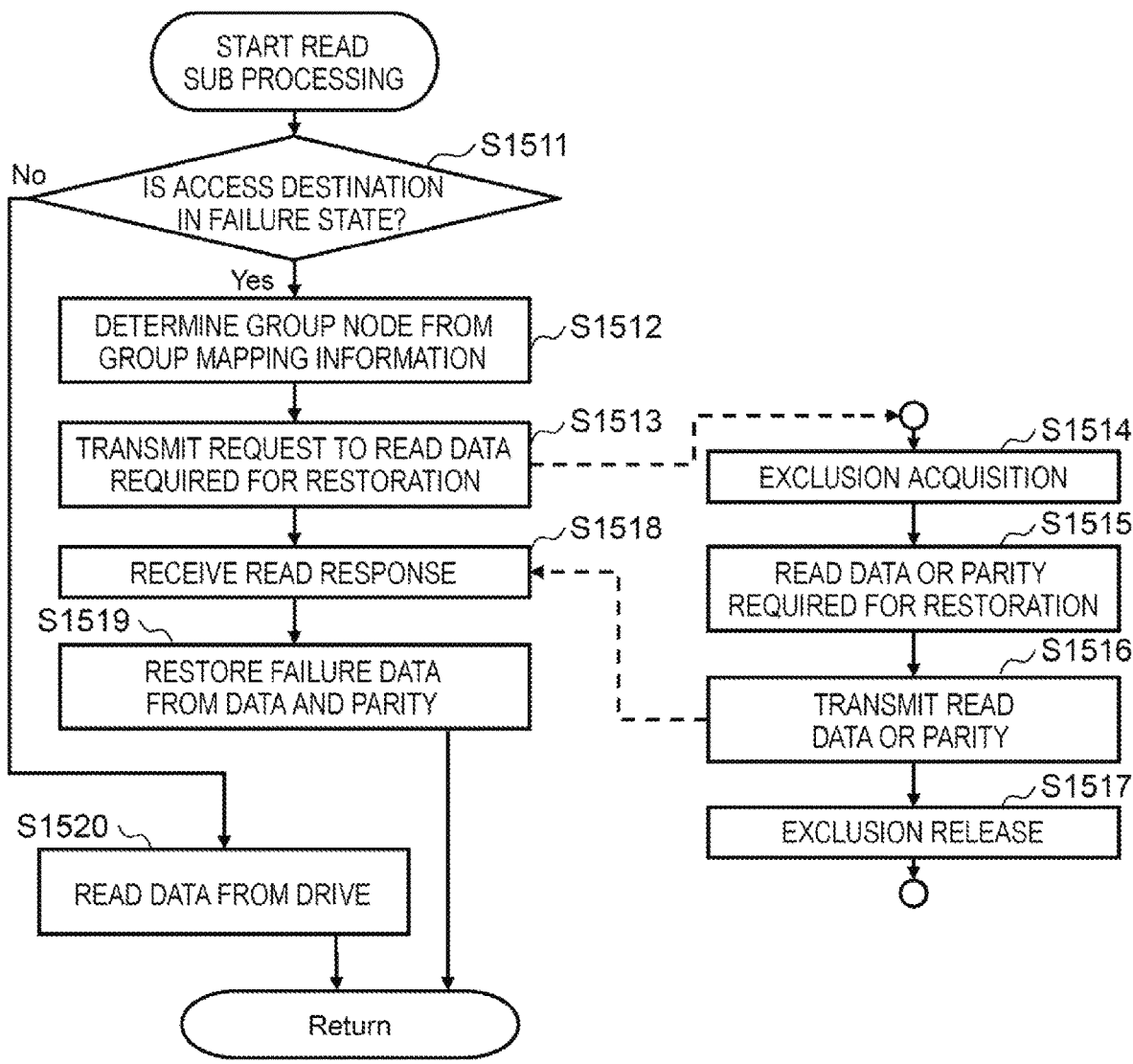
FIG. 16 is a diagram showing an example of a flowchart related to read sub processing according to the first embodiment.

FIG. 16 is a diagram showing an example of a read sub processing, that is, a flowchart related to step S1506 of FIG. 15. In the present embodiment, the read processing program 423 provides the read sub processing as the internal processing, and thus, the processing subject is described as the read processing program 423. Strictly speaking, steps S1514 to S1517 are different in the subject of processing but are included in this drawing for convenience of description. The details will be described below.

In step S1511, the read processing program 423 determines whether or not the access destination drive 214 is in a failure state. The read processing program 423 shifts the process to step S1512 if it is determined to be in a failure state, and shifts the process to step S1520 if it is determined to be not in a failure state.

In step S1512, the read processing program 423 determines the node 100 (group node) that forms a parity group with the read request data from the mapping management table 810. The group node determined in step S1512 in the description of FIG. 16 is referred to as a "target group node". In step S1513, the read processing program 423 transmits a request to read the data required for data restoration to the group node 100 determined in step S1512, that is, the target group node.

In step S1514, the read processing program 423 of the target group node performs exclusion acquisition. In step S1515, the read processing program 423 of the target group node reads the data or parity required for restoration from the drive. In step S1516, the read processing program 423 of the target group node transmits the data or parity read in step S1515 to the request transmission source node.

In step S1517, the read processing program 423 of the target group node performs exclusion release and ends the processing. That is, the read processing program 423 starts the processing shown in FIG. 15 when receiving a read request from the application 311, and performs the processes of steps S1514 to S1517 when receiving a read request from another read processing program 423.

In step S1518, the read processing program 423 receives a response to the read request transmitted by the read processing program 423 of the target group node in step S1513. In step S1519, the read processing program 423 restores the data to be read by the application 311 from the data and parity received in step S1518 and returns the processing result to the read processing. In step S1520, the read processing program 423 reads data from the drive 214 (local drive) of the own node 100 and returns the processing result to the read processing.

Figure 17:
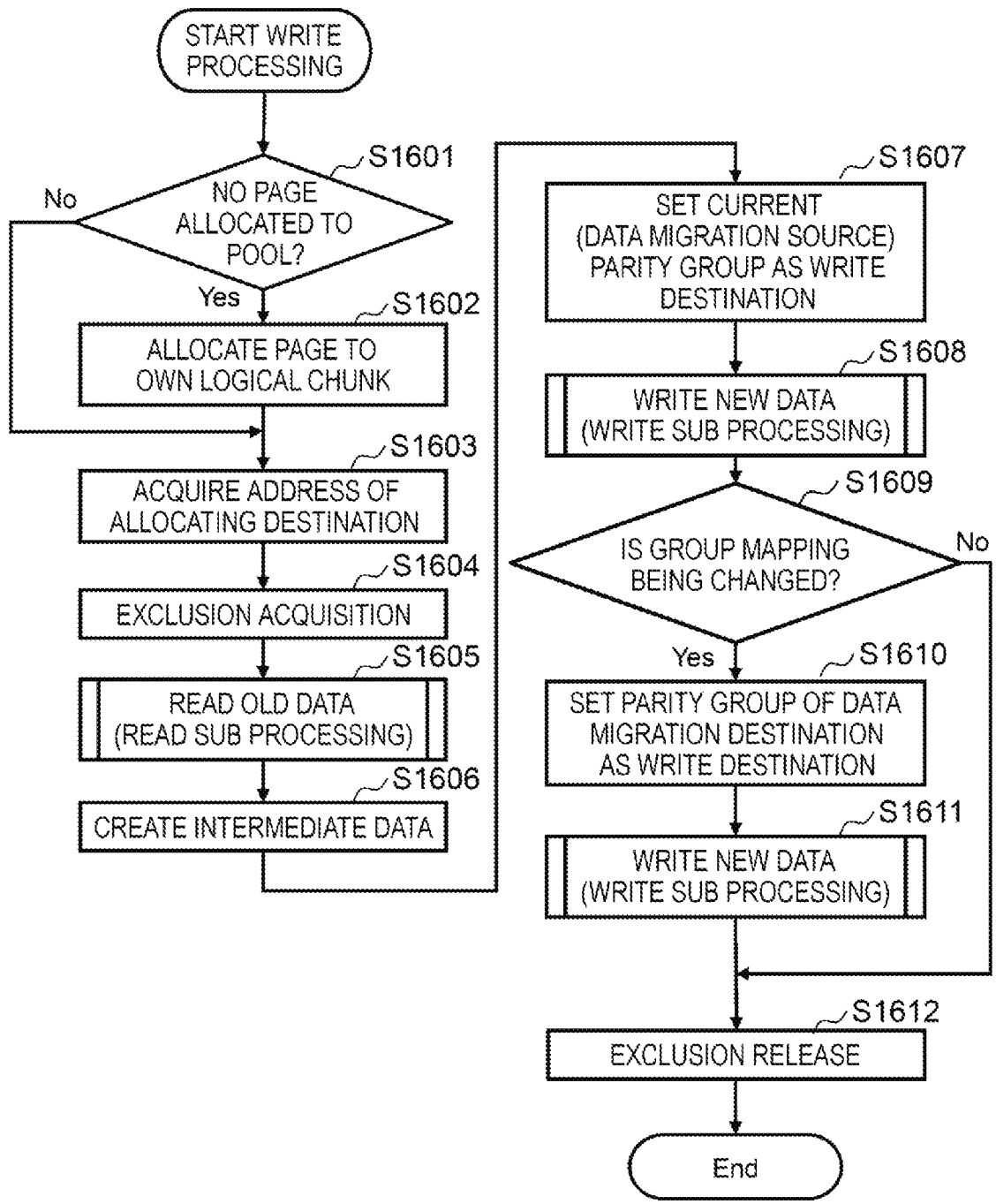
FIG. 17 is a diagram showing an example of a flowchart related to write processing according to the first embodiment.

FIG. 17 is a diagram showing an example of a flowchart related to write processing. In the write processing, upon receiving a request to write, that is, a write request from the application 311, data is written to the drive 214 of the own node 100, and redundant data, that is, parity is written to the drive 214 of another node 100. The application 311 specifies the address of the virtual volume that is the write target area together with the write request. The details will be described below.

In step S1601, the write processing program 424 determines whether or not the page 307 has not been allocated to the storage pool 305 for the write request data. The write processing program 424 shifts the process to step S1602 when it is determined that the page has not been allocated, and shifts the process to step S1603 when it is determined that the page has been allocated. In step S1602, the write processing program 424 allocates the page 307 to the virtual volume 306 associated with the physical chunk 301 of the drive 214 of the own node 100, that is, the own volume.

In step S1603, the write processing program 424 acquires the address of the allocating destination. In step S1604, the write processing program 424 performs exclusion acquisition. In step S1605, the write processing program 424 reads the data before writing (hereinafter referred to as "old data"). More specifically, the read sub processing shown in FIG. 16 is executed on the old data.

In step S1606, the write processing program 424 creates intermediate data. The intermediate data is temporary data created when partially updating the data and is data indicating the difference between the old and new. For example, when the stripe of the old data is "A1-A2-AP", the intermediate data is obtained by the following Equations 3 to 5. However, in Equations 3 to 5, AP_O indicates old parity, AP_N indicates new parity, A1_O indicates old data of A1, A1_N indicates new data of A1, A2_O indicates old data of A2, and M indicates intermediate data.

$$AP\_O = A1\_O \text{ XOR } A2\_O \qquad \text{Equation 3}$$

$$M = A1\_N \text{ XOR } A1\_O \qquad \text{Equation 4}$$

$$AP\_N = AP\_O \text{ XOR } M \qquad \text{Equation 5}$$

In step S1607, the write processing program 424 refers to the logical chunk management table 710 of the parity group management table 413 and sets the current parity group ID as the write target. When the configuration change processing is operating and data migration is in progress, the write processing program 424 sets the parity group ID of the data migration source as the write target. In step S1608, the write processing program 424 executes write sub processing for writing data to the drive.

In step S1609, the write processing program 424 determines whether or not the group mapping is being changed. More specifically, the write processing program 424 refers to the logical chunk management table 710 of the parity group management table 413 and when the migration source and migration destination IDs are recorded in the parity group ID, the write processing program 424 determines that the group mapping is being changed. When it is determined that the group mapping is being changed, the write processing program 424 shifts the process to step S1610. When it is determined that the group mapping is not being changed, the write processing program 424 shifts the process to step S1612.

In step S1610, the write processing program 424 refers to the logical chunk management table 710 of the parity group management table 413 and sets the migration destination parity group ID as the write target. In step S1611, the write processing program 424 executes write sub processing to write data to the drive. The write sub processing will be described in detail with reference to FIG. 18. In step S1612, the write processing program 424 performs exclusion release, returns a response to the application 311, and ends the write processing.

Figure 18:
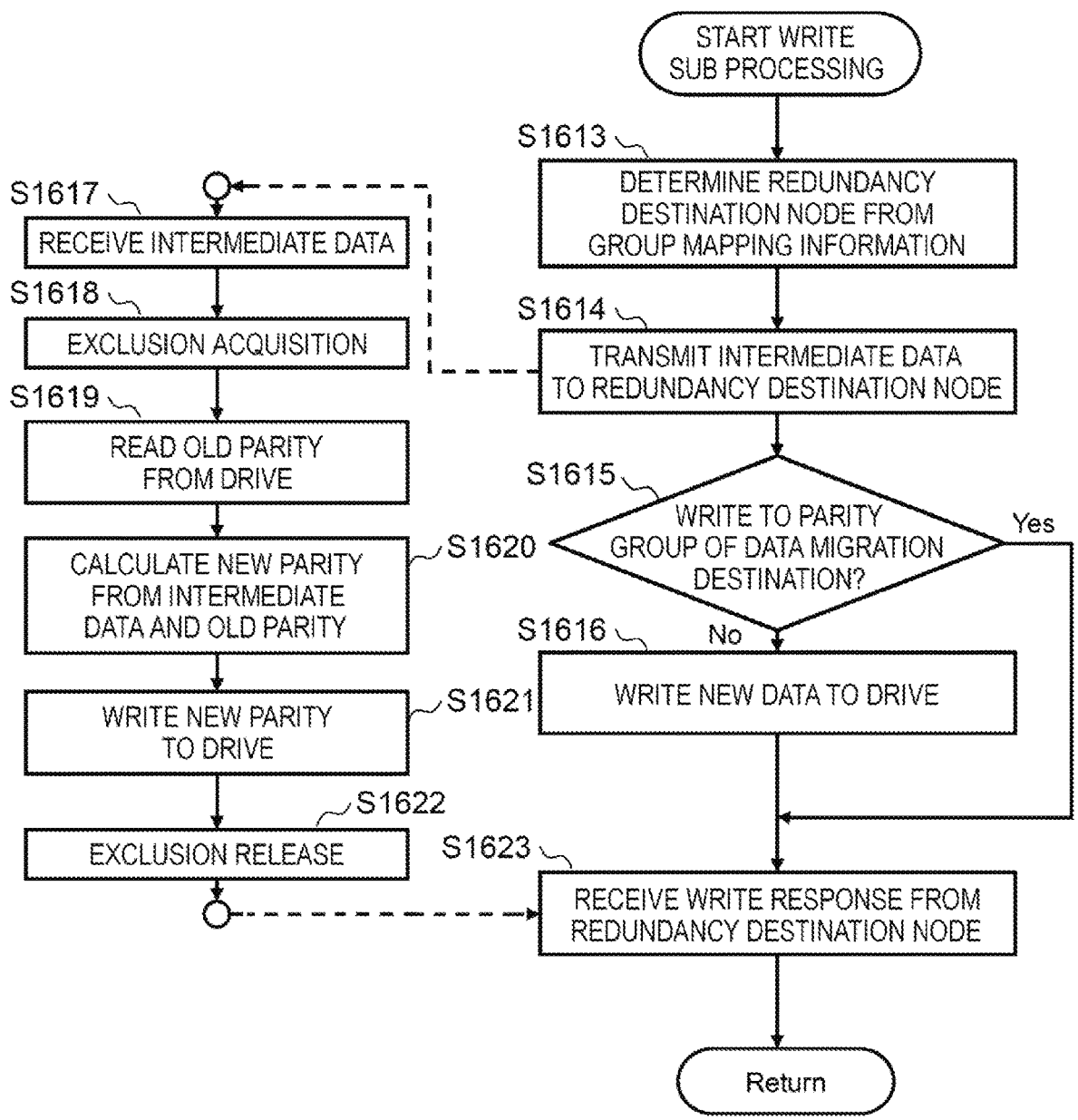
FIG. 18 is a diagram showing an example of a flowchart related to write sub processing according to the first embodiment.

FIG. 18 is a diagram showing an example of a flowchart related to the write sub processing. In the present embodiment, the write processing program 424 provides the write sub processing as the internal processing, and therefore the processing subject is described as the write processing program 424. Strictly speaking, steps S1617 to S1622 are different in the subject of processing but are included in this drawing for convenience of description. The details will be described below.

In step S1613, the write processing program 424 refers to the mapping management table 810 to determine the node 100 of the redundancy destination. In step S1614, the write processing program 424 transmits the intermediate data to the node 100 of the redundancy destination (hereinafter, referred to as "target node") determined in step S1613. The write processing program 424 transmits the intermediate data to two or more nodes 100 depending on the redundancy, for example, when the redundancy is two or more.

In step S1615, the write processing program 424 determines whether or not the current processing is write processing targeting the parity group of the data migration destination. Whether or not the write is to the data migration destination is determined by whether or not the parity group ID set as the migration destination matches the parity group ID currently set as the write destination, with reference to the logical chunk management table 710 of the parity group management table 413. When it is determined that the write is to the parity group of the data migration destination, the write processing program 424 shifts the process to step S1623. When it is determined that the write is not to the data migration destination parity group, the write processing program 424 shifts the process to step S1616.

By the process of step S1615, the number of writes to the local drive can be reduced for the parity group of the data migration destination while the group mapping is being changed. In step S1616, the write processing program 424 writes the write request data (new data) to the local drive.

In step S1617, the write processing program 424 of the target node receives the intermediate data. In step S1618, the write processing program 424 of the target node performs exclusion acquisition. In step S1619, the write processing program 424 of the target node reads the old parity from the drive of the own node 100, that is, the local drive. In step S1620, the write processing program 424 of the target node calculates the new parity from the intermediate data and the old parity. In step S1621, the write processing program 424 of the target node writes the new parity in the local drive. In step S1622, the write processing program 424 of the target node performs exclusion release, and the processing when receiving the intermediate data is ended.

In step S1623, the write processing program 424 of the target node waits to receive the write response from the redundancy destination node and ends the write processing when receiving the response.

Figure 19:
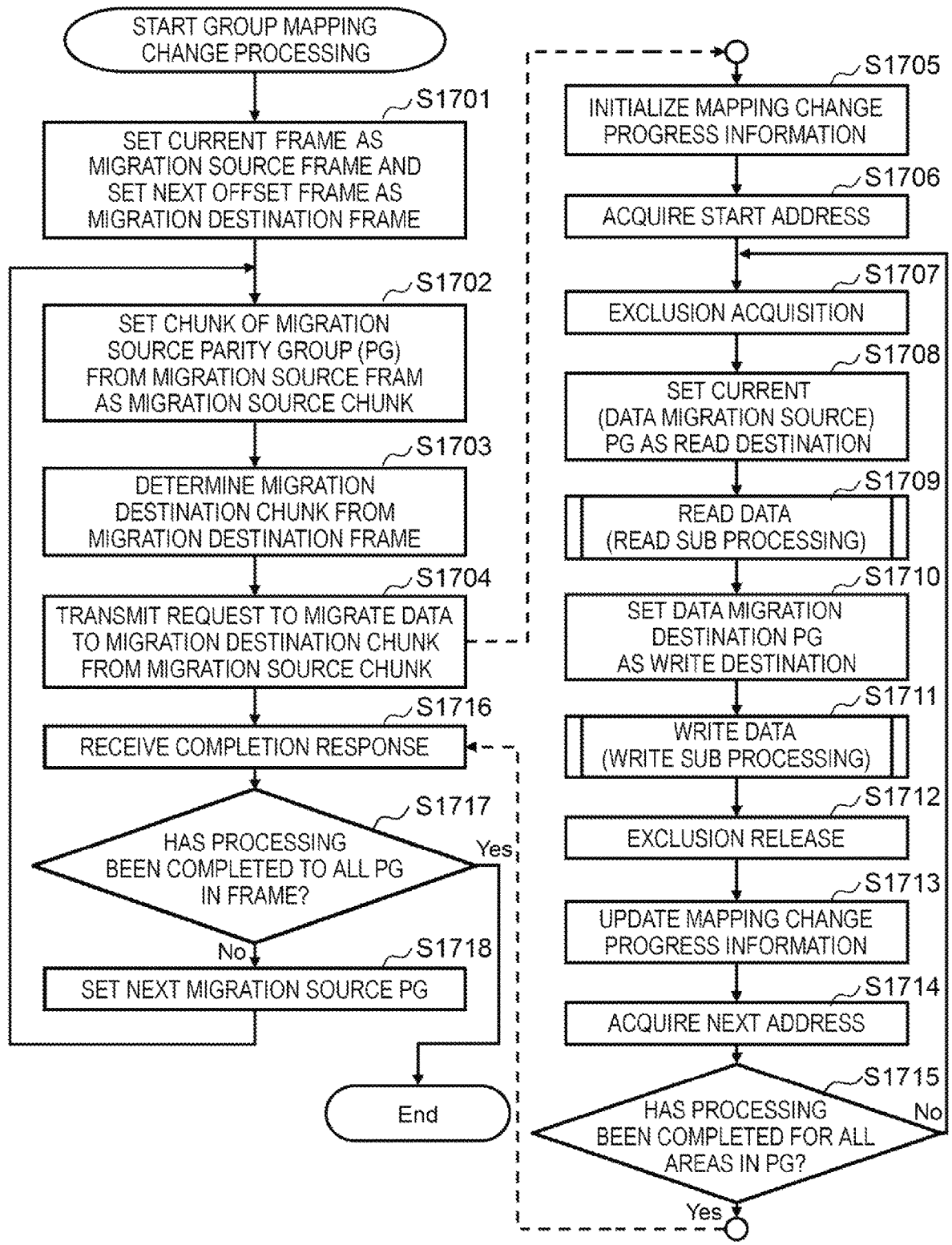
FIG. 19 is a diagram showing an example of a flowchart related to mapping change processing according to the first embodiment.

FIG. 19 is a diagram showing an example of a flowchart related to the group mapping change processing. The group mapping change processing is constituted of two programs. The flowchart starting from step S1701 controls data migration for the entire parity group in a frame, and the flowchart starting from step S1705 controls data migration for one parity group. The details will be described below.

In step S1701, the group mapping change processing program 425 sets the current frame as the migration source frame and the next offset frame as the migration destination frame. In step S1702, the group mapping change processing program 425 sets the physical chunk 301 of the migration source parity group (hereinafter, referred to as "migration source chunk") from the migration source frame as the migration source.

In step S1703, the group mapping change processing program 425 sets the physical chunk 301 of the migration destination parity group (hereinafter, referred to as "migration destination chunk") in the migration destination frame as the migration destination. In step S1704, the group mapping change processing program 425 transmits a request (migration request) to move data from the migration source chunk to the migration destination chunk to the node 100 having the migration source chunk.

In step S1705, the group mapping change processing program 425 of the node 100 (hereinafter, referred to as "receiving node") that has received the migration request initializes the mapping change progress information 714. In step S1706, the group mapping change processing program 425 of the receiving node acquires the start address of the migration source chunk. In step S1707, the group mapping change processing program 425 of the receiving node performs exclusion acquisition.

In step S1708, the group mapping change processing program 425 of the receiving node sets the data migration source parity group (PG) as the read destination. In step S1709, the group mapping change processing program 425 of the receiving node reads data from the area indicated by the set parity group and address. More specifically, the read sub processing is executed. In step S1710, the group mapping change processing program 425 of the receiving node sets the data migration destination parity group (PG) as the write destination.

In step S1711, the group mapping change processing program 425 of the receiving node writes the data read in step S1709. More specifically, the write sub processing is executed. In step S1712, the group mapping change processing program 425 of the receiving node performs exclusion release. In step S1713, the group mapping change processing program 425 of the receiving node updates the mapping change progress information 714. For example, the mapping change progress information is updated to the value V calculated by Equation 6 below.

$$V = \text{(Current migration target LBA/Maximum LBA of migration source chunk)} \times 100 \quad \text{Equation 6}$$

In step S1714, the group mapping change processing program 425 of the receiving node acquires the address for the next data migration. In step S1715, the group mapping change processing program 425 of the receiving node determines whether or not the data migration processing has been completed for all the areas in the parity group. More specifically, the group mapping change processing program 425 of the receiving node determines that the data migration processing has been completed when the mapping change progress information 714 indicates 100%. When it is determined that the data migration processing has been completed, the group mapping change processing program 425 of the receiving node shifts the process to step S1716. When it is determined that the data migration processing has not been completed, the group mapping change processing program 425 of the receiving node shifts the process to step S1707.

In step S1716, the group mapping change processing program 425 receives the completion of response from the node 100 which has transmitted the migration request. In step S1717, the group mapping change processing program 425 determines whether or not the data migration processing has been completed for all parity groups (PG) in the frame. When it is determined that the data migration processing has been completed for all parity groups (PG) in the frame, the group mapping change processing program 425 ends the group mapping change processing. When it is determined that the data migration processing has not been completed for all parity groups (PG) in the frame, the group mapping change processing program 425 shifts the process to step S1718. In step S1718, the group mapping change processing program 425 sets the parity group (PG) of the next migration target and shifts the process to step S1702.

According to the first embodiment described above, the following operational effects can be obtained.

(1) The site 201 includes a plurality of nodes 100 that provide a storage area and the drive 214 that physically stores data. The site 201 forms a parity group with a plurality of data including user data stored in the storage area and redundant data for protecting the user data, and a plurality of data in the parity group are stored in a storage area within one predetermined range across a plurality of nodes. Processing for dividing the predetermined range or processing for merging a plurality of predetermined ranges is performed based on the state of the predetermined range. Therefore, a storage system with high reliability and applicability can be realized.

(2) The predetermined range described above is a node group. By adopting the second method in step S1401, it is possible to perform the processing related to division or merge based on the number of nodes 100 included in the node group.

(3) By combining the second method and the third method in step S1401, it is possible to perform the processing related to division or merge based on the number of nodes 100 and the capacity per group. In this case, the reliability can be further improved by considering not only the number of nodes but also the capacity.

(4) The processing of division or merge is to divide a first predetermined range into a second predetermined range and a third predetermined range. A parity group configured with a plurality of data stored in the first predetermined range is moved to generate a parity group stored in the second predetermined range and a parity group stored in the third predetermined range.

(5) The above-mentioned processing of division or merge is to merge a fourth predetermined range and a fifth predetermined range into a sixth predetermined range.

(6) By moving the data included in the parity group, the parity group is stored within a predetermined range after division or merge.

(7) By replacing the user data included in the parity group with other user data, and generating and storing the parity data based on the user data after the replacement, the parity group is stored within a predetermined range after division or merge.

(8) A new parity group is configured with a plurality of user data stored in a predetermined range after division or merge, and parity data is newly generated from the plurality of user data and stored in a predetermined range after division or merge.

(9) When the storage area is increased or decreased by adding or removing a drive, node, or site, or when there is a host write, the data is moved by the increase or decrease of the storage area or the data is updated by the host write, and the parity group is moved to a predetermined range after division or merge.

Second Embodiment

A second embodiment of the storage system will be described with reference to FIGS. 20 to 23. In the following description, the same components as those of the first embodiment are designated by the same reference numerals, and the differences are mainly described. The points that are not particularly described are the same as those in the first embodiment. The present embodiment is different from the first embodiment mainly in that the target is a shared storage system. In other words, although the first embodiment has described one site including a plurality of nodes, the present embodiment will describe one node including a plurality of disks. In the following, the configuration different from that of the first embodiment will be mainly described.

Figure 20:
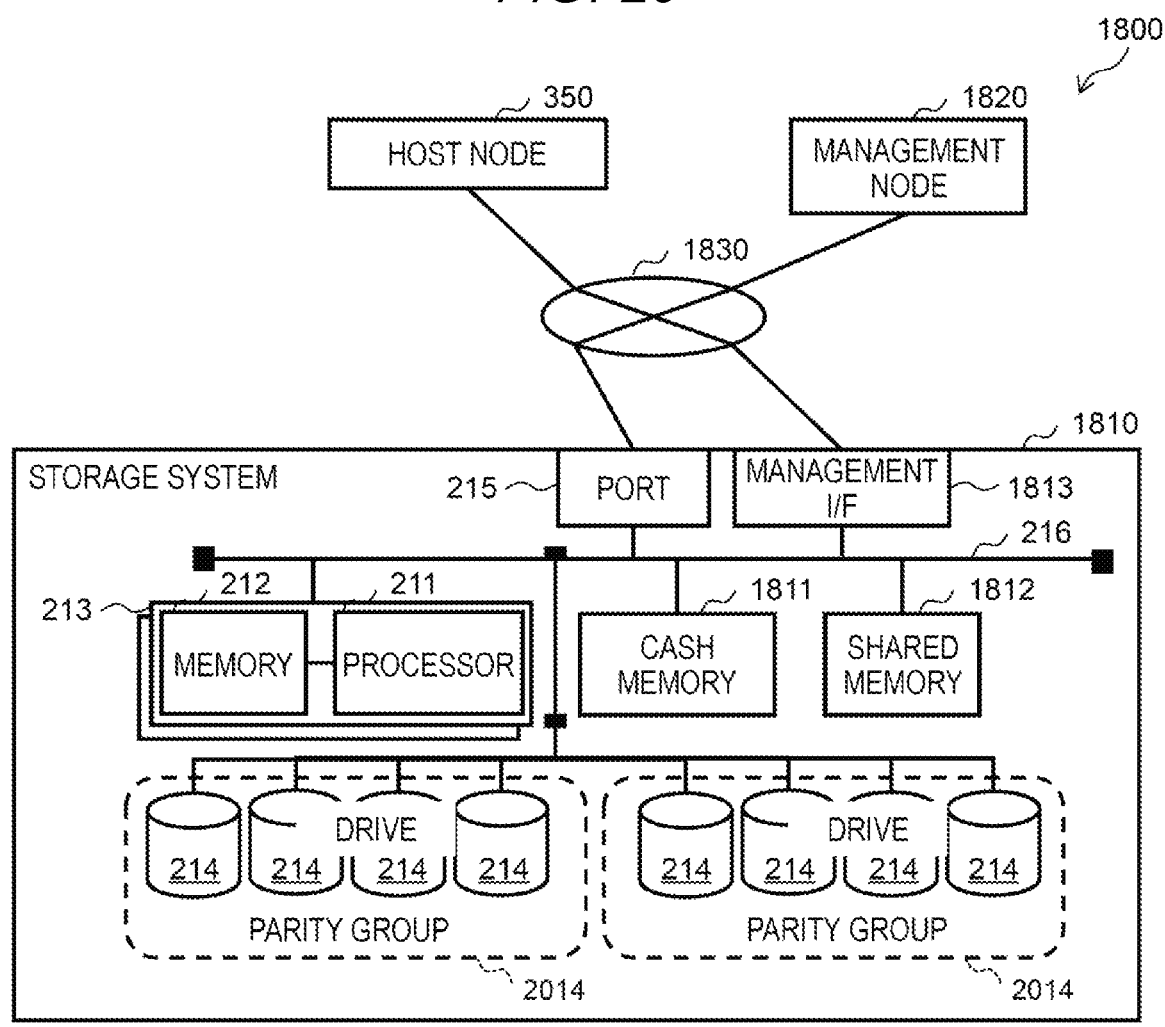
FIG. 20 is a diagram showing an example of a configuration related to a computer system according to a second embodiment.

FIG. 20 is a diagram showing an example of the configuration according to a computer system 1800 of the present embodiment. Regarding the same configuration as the first embodiment, the same numerals are used and the description will be omitted. The computer system 1800 is configured to include a storage system 1810, a management node 1820, and a host node 350. The storage system 1810, the management node 1820, and the host node 350 are communicably connected via a network 1830. The type of the network 1830 is not particularly limited but storage area network (SAN), IEEE 802.3, or the like can be used, for example.

The storage system 1810 is configured to include one or more processor packages 213 including a processor 211, a memory 212, and the like, one or more drives 214, one or more ports 215, a cache memory 1811, a shared memory 1812, and a management I/F 1813. The processor package 213, the port 215, the cache memory 1811, and the shared memory 1812 are connected via the internal bus 216. The drive 214 and other components may be connected by the internal bus 216 or may be connected using a wired network such as IEEE802.3 with separation of the cases thereof to form a fabric such as NVMe over Fabric.

The cache memory 1811 is a high-speed accessible memory for storing data as temporary cache data in order to improve the throughput, response, and the like of the I/O processing of the storage system 1810. The shared memory 1812 is a memory that stores information for the control necessary for the processor 211 to process a read command, a write command, and the like and execute a function of the storage (a copy function of the virtual volume 306, or the like). The shared memory 1812 is a memory that stores information shared by the processors 211 among the plurality of processor packages 213.

The management I/F 1813 is connected to the network 1830 and communicably connected to the management node 1820. In the storage system 1810, a plurality of drives 214 are used to form a parity group 1814 in order to protect data from a failure. The management node 1820 is connected to the management I/F 1813 or the port 215 of the storage system 1810 via the network 1830. The storage administrator uses the management node 1820 to send various settings required for operating the storage system 1810, commands for management, and the like to the storage system 1810.

Figure 21:
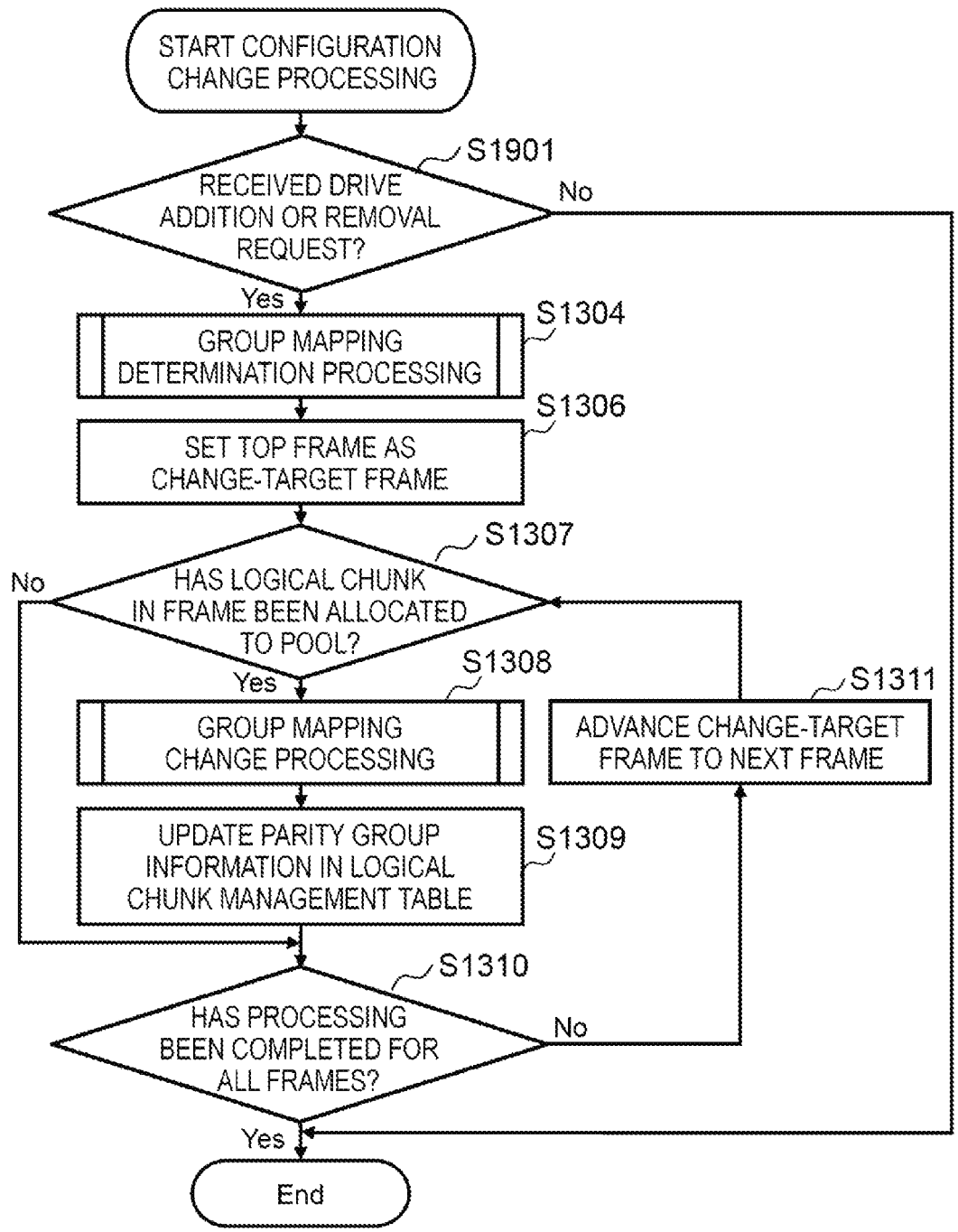
FIG. 21 is a diagram showing an example of a flowchart related to configuration change processing according to the second embodiment.

FIG. 21 is a diagram showing an example of a flowchart related to the configuration change processing. The same contents as those of the configuration change processing of the first embodiment are designated by the same reference numerals and the descriptions thereof will be omitted. The configuration change processing in the second embodiment starts from step S1901. In step S1901, the configuration change processing program 421 determines whether or not an instruction to add or remove the drive 214 (drive addition or removal instruction) has been received. The configuration change processing program 421 shifts the process to step S1304 when it is determined that the instruction has been received, and ends the configuration change processing when it is determined that the instruction has not been received. The processes after step S1304 are the same as those in the first embodiment and the descriptions thereof will be omitted.

Figure 22:
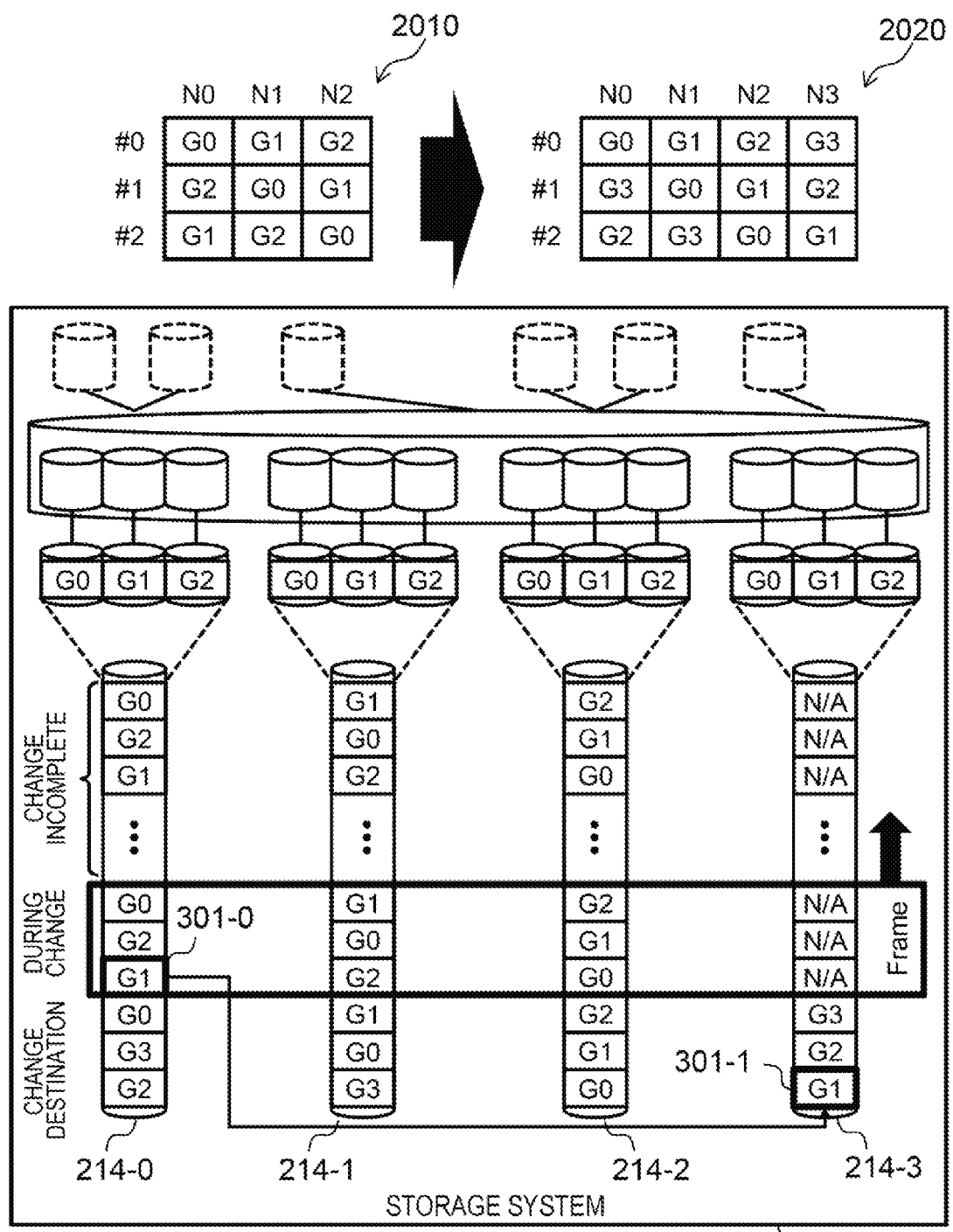
FIG. 22 is a schematic diagram of a mapping change according to the second embodiment.

FIG. 22 is a schematic diagram of mapping change. The description of the same contents as the configuration change processing of the first embodiment will be omitted and only different contents will be described. Here, as shown in a location node correspondence table 2010 and a location node correspondence table 2020, a case where the drive 214-3 of "N3" is added will be described as an example. In the second embodiment, since there is only one node (storage controller) and the locality of data can always be maintained, the mapping is changed by moving the data between the drives instead of recalculating the parity. For example, the mapping is changed by copying the data of the migration source chunk 301-0 forming the parity group 302 of "G0" to the migration destination chunk 301-1.

Figure 23:
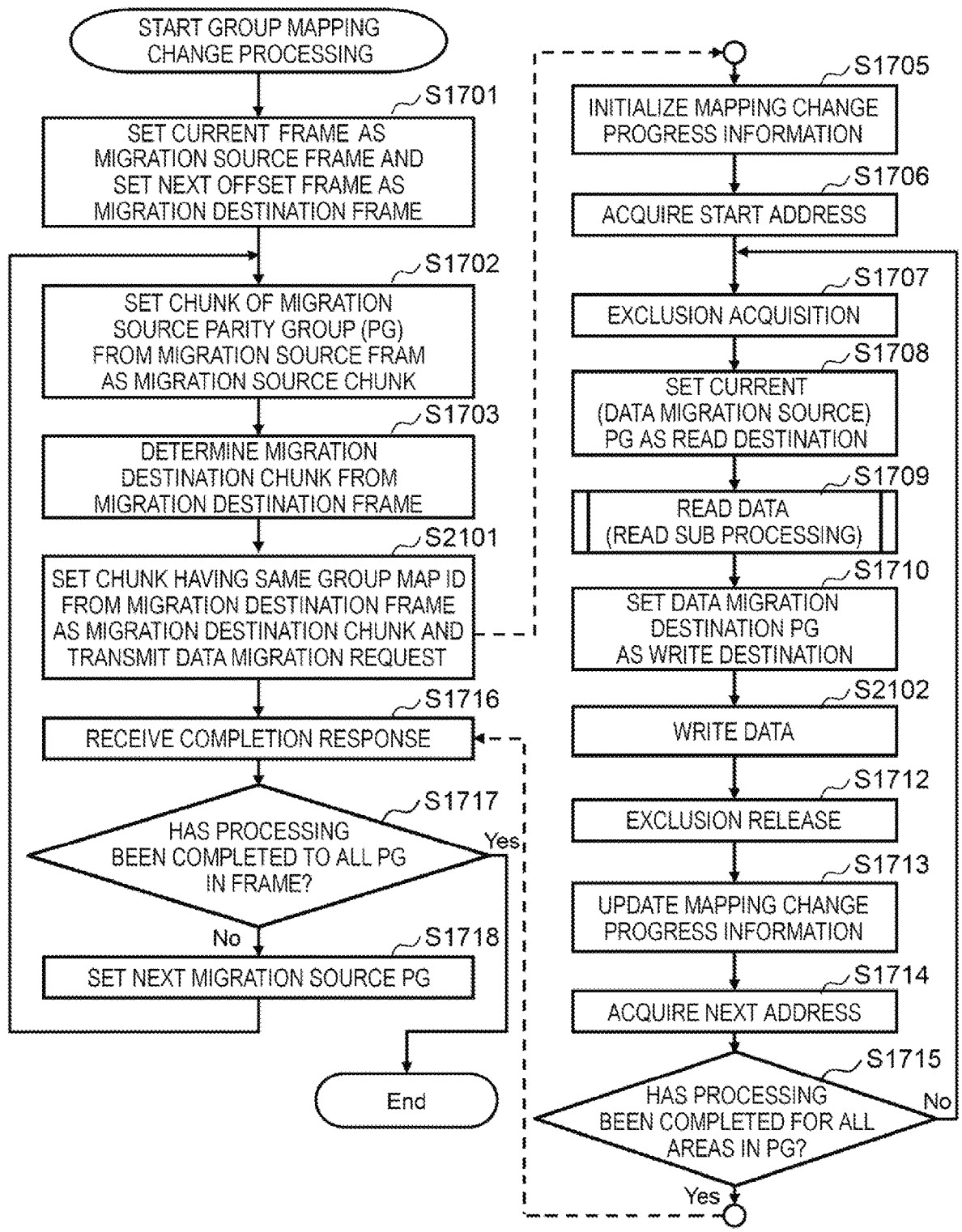
FIG. 23 is a diagram showing an example of a flowchart related to mapping change processing according to the second embodiment.

FIG. 23 is a diagram showing an example of a flowchart related to the group mapping change processing according to the second embodiment. The same processes as the group mapping change processing of the first embodiment are designated by the same reference numerals and the descriptions thereof will be omitted. In the second embodiment, the process of step S2101 is performed after step S1703. In step S2101, the group mapping change processing program 425 sets the physical chunk of the node having the same group map ID from the migration destination frame as the migration destination chunk and transmits a data migration request.

Unlike the first embodiment, the process of step S2102 is performed after step S1710. In step S2102, the group mapping change processing program 425 of the node 100 that has received the migration request directly writes the data read in step S1709 to the drive corresponding to the physical chunk that is the migration destination. As a result, the mapping is changed by only moving the data between the drives without recalculating the parity. The other processes are the same as those of the first embodiment, and thus the descriptions thereof are omitted.

According to the second embodiment described above, the following operational effect can be obtained.

(10) The above-mentioned predetermined range is a drive group. The group mapping determination processing program 422 performs processing for division or merge based on the number of drives included in the drive group. Therefore, the same effects as those of the first embodiment can be obtained in one node.

(Modification 1)

Modification 1 will be described with reference to FIG. 24. In the following description, the same components as those of the first embodiment are designated by the same reference numerals and the differences are mainly described. The points that are not particularly described are the same as those in the first embodiment. The present embodiment differs from the first embodiment mainly in that data locality is not maintained.

Figure 24:
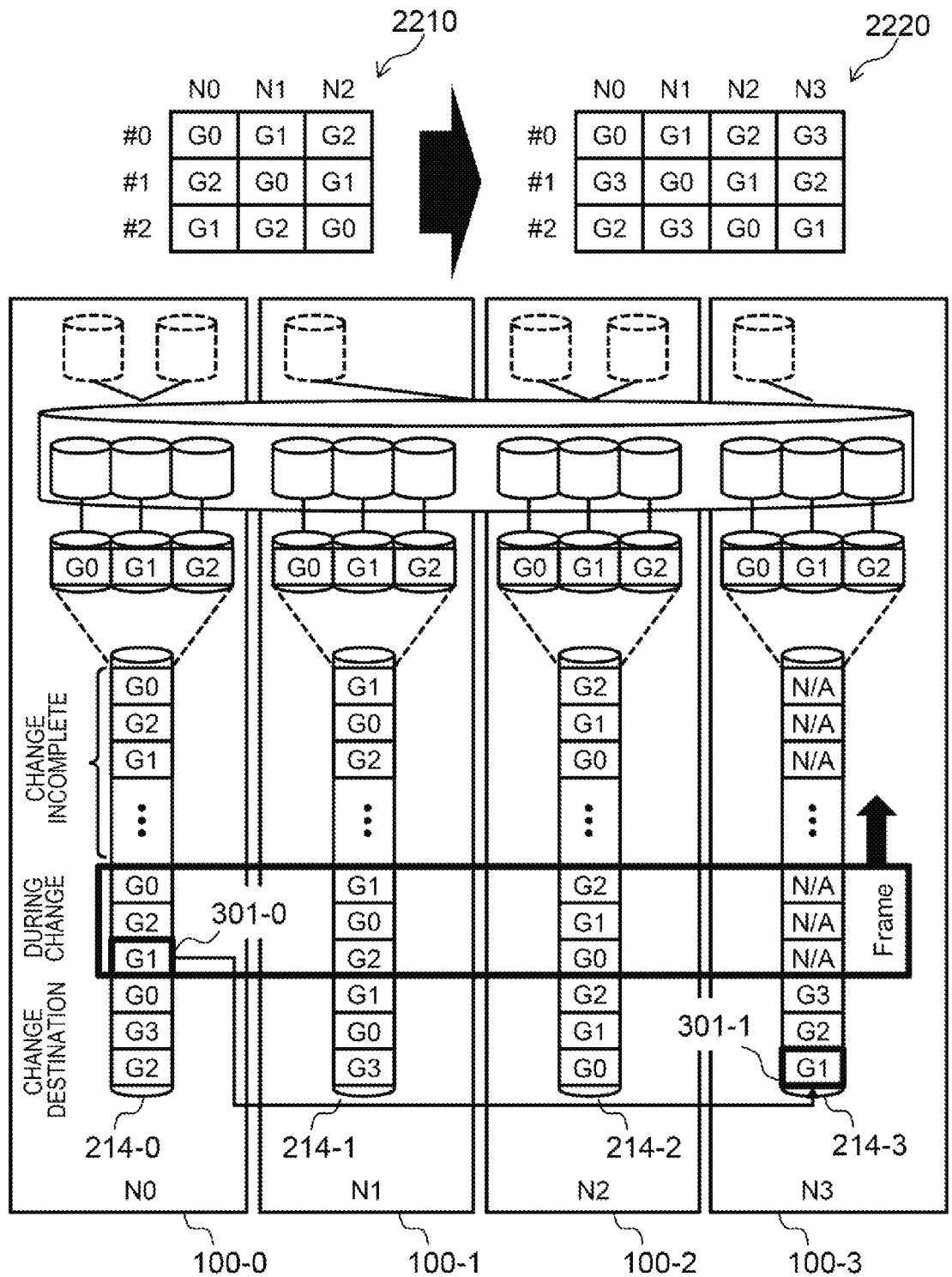
FIG. 24 is a schematic diagram of a mapping change according to Modification 1.

FIG. 24 is a schematic diagram of mapping change in Modification 1. The description of the same contents as the configuration change processing of the first embodiment will be omitted and only different contents will be described. Here, as shown in a location node correspondence table 2210 and a location node correspondence table 2220, a case where the node 100-3 of "N3" is added will be described as an example.

In Modification 1, since the locality of data is not maintained, the mapping is changed by moving the data between nodes. For example, the mapping is changed by copying the data of the migration source chunk 301-0 forming the parity group 302 of "G0" to the migration destination chunk 301-1. Therefore, in Modification 1, the processing of the group mapping change processing program 425 is the same as the processing shown in FIG. 23 in the second embodiment.

According to Modification 1, it is possible to obtain the same operational effects as those of the first embodiment even when the locality of data is not maintained such as when the drive 214 having a slow reading speed is used.

(Modification 2)

Modification 2 will be described with reference to FIGS. 25 to 26. In the above-described embodiments, the number of divisions of the mapping is changed by the group mapping determination processing, if necessary, by the so-called automatic process. However, the user may be notified that the number of mapping divisions needs to be changed, and the number of mapping divisions may be changed only when instructed by the user.

Figure 25:
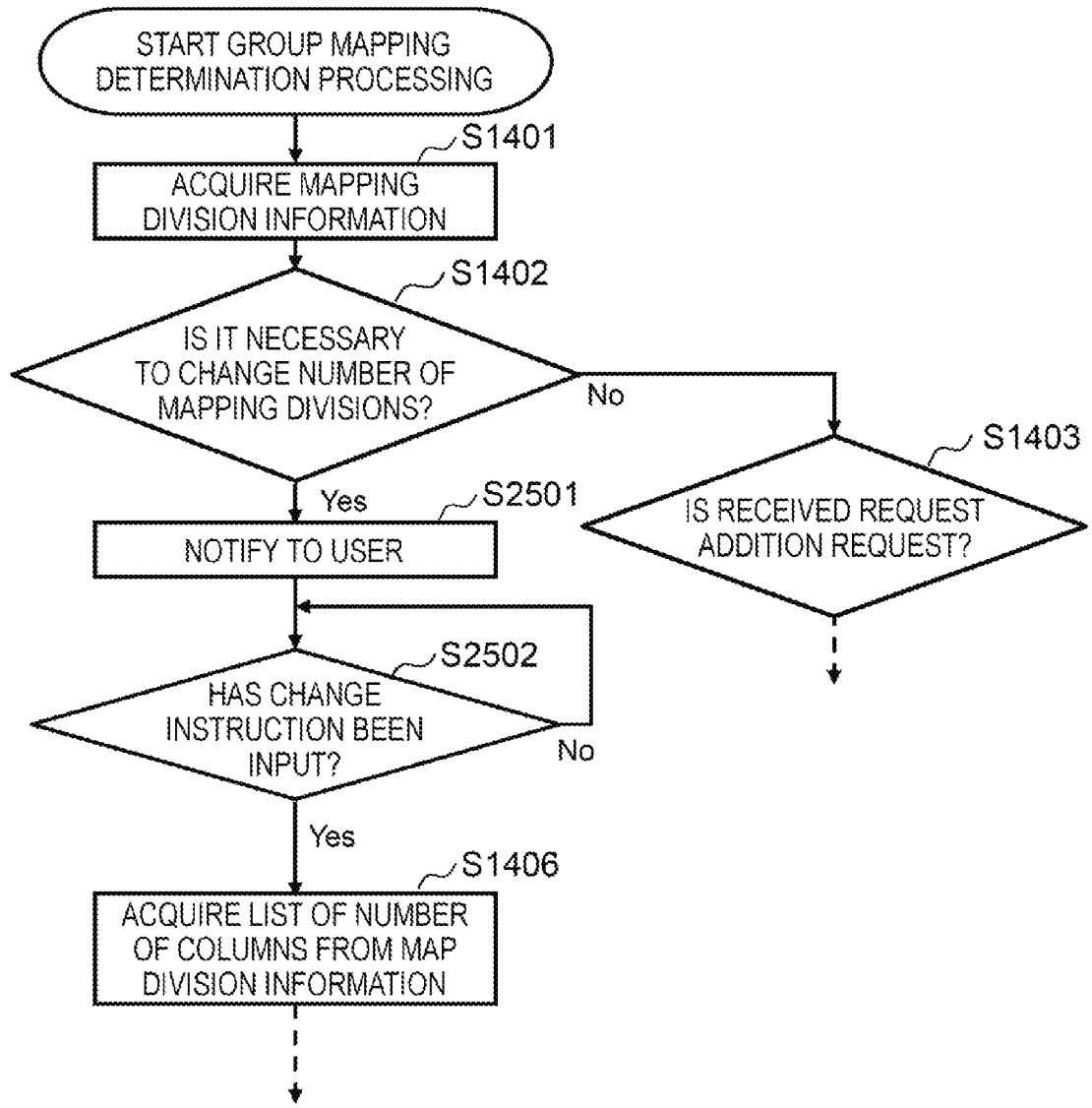
FIG. 25 is a diagram showing an example of a flowchart related to group mapping determination processing according to Modification 2.

FIG. 25 is a diagram showing an example of a flowchart of a group mapping determination processing according to Modification 2. Only differences from the first embodiment will be described here. Further, for convenience of drawing, in FIG. 25, the descriptions of the same processes as those of the first embodiment are omitted. In this modification, if the group mapping determination processing program 422 makes a positive determination in step S1402, the process proceeds to step S2501. When a negative determination is made in step S1402, the process proceeds to step S1403 as in the first embodiment, and the subsequent processes are also the same as in the first embodiment.

In step S2501, the group mapping determination processing program 422 notifies the user that the number of mapping divisions needs to be changed. For this notification, various means such as voice, characters, and video can be used. Since this notification indicates to the user the necessity of changing the number of mapping divisions and prompts the user to give an instruction, this notification can also be called processing for dividing parity group or merging parity groups.

In the following step S2502, the group mapping determination processing program 422 determines whether or not a change instruction, that is, an instruction to change the number of mapping divisions has been input by the user. Various means can be used for the input by the user, such as pressing a push button (not shown), touch operation on the touch panel, and voice instruction. The group mapping determination processing program 422 stays in step S2502 when making a negative determination in step S2502, and shifts the process to step S1406 when making a positive determination. Since the processes after step S1406 are the same as those in the first embodiment, the descriptions thereof will be omitted.

Figure 26:
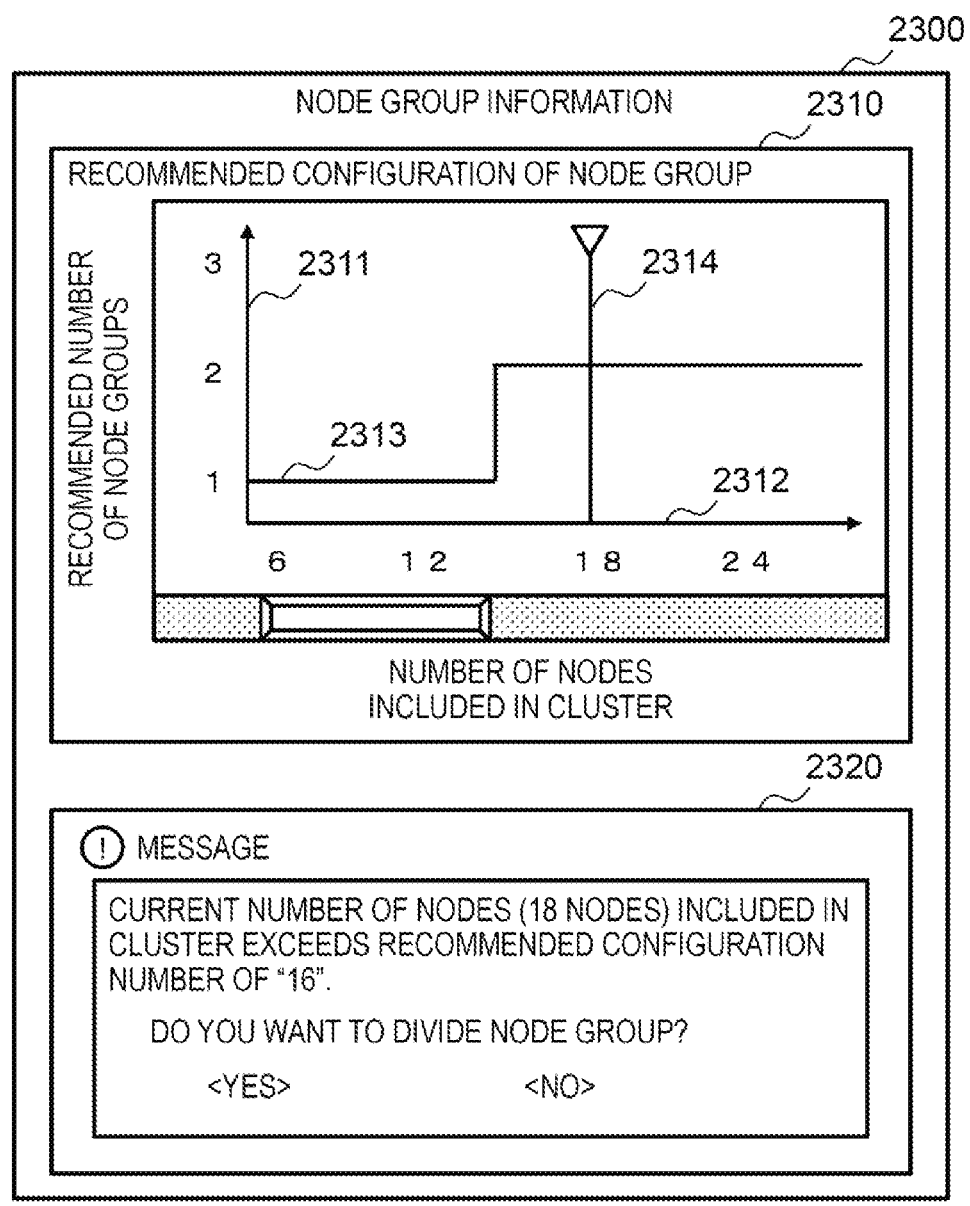
FIG. 26 is a schematic diagram of a user interface according to Modification 2.

FIG. 26 is a diagram showing an example of a screen display when a user is notified by a video in step S2501. Here, in the location node correspondence table, a node group to which one group map is applied is called a node group. Node group information 2300 includes recommended node group configuration information 2310 and message information 2320. The recommended node group configuration information 2310 includes a recommended number of node groups 3211, a biaxial graph with the number of nodes 2312 included in the cluster as an axis, a recommended number of the number of node groups 2313 for each number of nodes included in the cluster, and the information of the number of nodes 2314 included in the current cluster.

The recommended number of node groups 3211 is information indicating the number of node groups. More specifically, for example, information based on the number of map divisions 822 of the mapping division management table 820 is displayed. The number of nodes 2312 included in the cluster is information indicating the number of nodes included in the cluster and to which the group mapping is applied. More specifically, for example, information based on the number of nodes 821 of the mapping division management table 820 is displayed.

The recommended number of the number of node groups 2313 for each number of nodes included in the cluster is information indicating the recommended value of the node group configuration in the cluster including a certain number of nodes. More specifically, for example, a graph in which information is plotted based on the number of nodes 821 and the number of map divisions 822 of the mapping division management table 820 is displayed. The number of nodes 2314 included in the current cluster indicates information obtained by plotting the number of nodes included in the current cluster on the above-described biaxial graph.

The message information 2320 displays the text of information related to group mapping to the user. The text includes, for example, a content that explains whether or not the number of node groups in the current cluster configuration is appropriate, and a content that explains to the user the number of nodes that require division or merge of node groups. Further, in the message information 2320, a display prompting a change instruction is displayed as necessary.

According to Modification 2, the following operational effect can be obtained.

(11) The processing related to division or merge is to present a message recommending division or merge to the user. Therefore, it is possible to notify the user that the number of node groups is not appropriate and to change the number of node groups when receiving an instruction from the user.

(Modification 3)

In the first embodiment, it has been described that the present invention is applied to the increase or decrease in the number of nodes 100 constituting one site 201. In the second embodiment, it has been described that the present invention is applied to the increase or decrease in the number of drives 214 constituting one node 100. The present invention may be further applied to increase or decrease in the number of sites 201 constituting one cluster. The correlations of the first embodiment, the second embodiment, and Modification 3 are summarized as follows.

Here, that is, the superordinate concept of "storage system" and "storage device" is introduced. The "storage system" includes a plurality of "storage devices", and the "storage device" provides the "storage system" with a storage area. The "storage system" corresponds to the "site 201" in the first embodiment, the "node 100" in the second embodiment, and the "cluster" in Modification 3. Further, the "storage device" corresponds to the "node 100" in the first embodiment, the "drive 214" in the second embodiment, and the "site 201" in Modification 3.

Therefore, the present invention including Modification 3 can also be expressed as follows. The storage system includes a plurality of storage devices that provide a storage area, and a parity group is configured with a plurality of data including user data stored in the storage area and redundant data for protecting the user data. The storage system arranges a plurality of data in the parity group in one predetermined range across two or more storage devices, and when the number of the storage devices included in the storage system is changed, processing for dividing the predetermined range or merging a plurality of the predetermined ranges is performed based on the number of the storage devices after the change.

In addition, in the above-described embodiments, a case where the present invention is applied to the storage system has been described, but the present invention is not limited thereto, and can be widely applied to various other systems, devices, methods, programs, and recording media for recording programs. Further, in the above-described embodiments, the configuration of each table is an example, and one table may be divided into two or more tables, or all or some of the two or more tables may be one table.

Further, in the above-described embodiment, various data are described using the XX table for the convenience of description, but the data structure is not limited and may be expressed as XX information. Further, in the above description, information such as programs, tables, and files for realizing each function can be placed on a storage device such as a memory, a hard disk, a solid state drive (SSD) or the like, or a recording medium such as an IC card, an SD card, a DVD, or the like.

The present invention is useful, for example, in increasing or decreasing the number of nodes and devices in a storage system. For example, since flexible construction and operation of a highly reliable storage system using inexpensive network equipment is possible, the present invention is highly useful. Further, the configurations described above may be appropriately changed, rearranged, combined, or omitted without departing from the gist of the present invention.

What is claimed is:

1. A storage system comprising:
a plurality of nodes that provide a storage area, and
a drive that physically stores data, wherein
a parity group is configured with a plurality of data including user data stored in the storage area and redundant data for protecting the user data,
a plurality of data in the parity group are stored in a storage area within one predetermined range of nodes across the plurality of nodes, and
processing for dividing the predetermined range of nodes or processing for merging a plurality of predetermined ranges of nodes is performed based on a state of the predetermined range of nodes and a storage capacity included in the predetermined range.

2. The storage system according to claim 1, wherein
the predetermined range is a node group, and
processing related to the division or the merge is performed based on the number of nodes included in the node group.

3. The storage system according to claim 1, wherein
the plurality of nodes are installed at a plurality of sites, and
processing related to the division or the merge is performed based on the number of sites that constitute the predetermined range.

4. The storage system according to claim 1, wherein
the predetermined range is a drive group, and
processing related to the division or the merge is performed based on the number of nodes included in the drive group.

5. The storage system according to claim 1, wherein
the processing related to the division or the merge is to divide a first predetermined range into a second predetermined range and a third predetermined range, and
a parity group configured with a plurality of data stored in the first predetermined range is moved to generate a parity group stored in the second predetermined range and a parity group stored in the third predetermined range.

6. The storage system according to claim 1, wherein the processing related to the division or the merge is to merge a fourth predetermined range and a fifth predetermined range into a sixth predetermined range.

7. The storage system according to claim 1, wherein the processing related to the division or the merge is to present a message recommending the division or the merge to the user.

8. The storage system according to claim 1, wherein the parity group is stored within a predetermined range after the division or the merge by moving the data included in the parity group.

9. The storage system according to claim 1, wherein the parity group is stored within a predetermined range after the division or the merge by replacing user data included in the parity group with other user data, and generating and storing parity data based on the user data after the replacement.

10. The storage system according to claim 9, wherein a new parity group is configured with a plurality of user data stored in a predetermined range after the division or the merge, and the parity data is newly generated from the plurality of user data to store the parity data in a predetermined range after the division or the merge.

11. The storage system according to claim 1, wherein when the storage area is increased or decreased by adding or removing a drive, node, or site, or when there is a host write, the data is moved by the increase or decrease of the storage area or the data is updated by the host write, and a parity group is moved to a predetermined range after the division or the merge.

12. A processing method executed by a storage system including a plurality of nodes for providing a storage area, the method comprising:
configuring a parity group with a plurality of data including user data stored in the storage area and redundant data for protecting the user data;
allocating a plurality of data in the parity group to a storage area within one predetermined range of nodes across the plurality of nodes; and
performing processing for dividing the predetermined range of nodes or processing for merging a plurality of predetermined ranges of nodes based on a state of the predetermined range of nodes and a storage capacity included in the predetermined range.

13. A storage system comprising:
a plurality of nodes that provide a storage area, and
a drive that physically stores data, wherein
a parity group is configured with a plurality of data including user data stored in the storage area and redundant data for protecting the user data,
a plurality of data in the parity group are stored in a storage area within one predetermined range across the plurality of nodes, and
processing for dividing the predetermined range or processing for merging a plurality of predetermined ranges is performed based on a state of the predetermined range, wherein
the predetermined range is a node group, and
processing related to the division or the merging is performed based on a comparison between the number of nodes included in the node group and a predetermined threshold, the predetermined threshold being over two times of a sum of data stored in a parity group and a sum of redundant data.

14. A processing method executed by a storage system including a plurality of nodes for providing a storage area, the method comprising:
configuring a parity group with a plurality of data including user data stored in the storage area and redundant data for protecting the user data;
allocating a plurality of data in the parity group to a storage area within one predetermined range across the plurality of nodes; and
performing processing for dividing the predetermined range or processing for merging a plurality of predetermined ranges based on a state of the predetermined range, wherein
the predetermined range is a node group, and
processing related to the division or the merging is performed based on a comparison between the number of nodes included in the node group and a predetermined threshold, the predetermined threshold being over two times of sum of data stored in a parity group and a sum of redundant data.

* * * * *